(12) United States Patent  
Finan et al.

(10) Patent No.: US 7,035,540 B2  
(45) Date of Patent: Apr. 25, 2006

(54) OPTICAL FIBER RING COMMUNICATION SYSTEM

(75) Inventors: Christopher D. Finan, Cupertino, CA (US); Mark Farley, Napa, CA (US)

(73) Assignee: CIENA Corporation, Linthicum, MD (US)

( * ) Notice: Subject to any disclaimer, the term of this patent is extended or adjusted under 35 U.S.C. 154(b) by 48 days.

(21) Appl. No.: 10/750,808

(22) Filed: Jan. 5, 2004

(65) Prior Publication Data

US 2004/0136711 A1   Jul. 15, 2004

Related U.S. Application Data

(62) Division of application No. 09/660,388, filed on Sep. 12, 2000, now Pat. No. 6,718,139.

(60) Provisional application No. 60/153,519, filed on Sep. 13, 1999.

(51) Int. Cl.  
*H04B 10/20* (2006.01)

(52) U.S. Cl. .................. 398/59; 398/3; 398/5; 398/7; 398/42; 398/48; 398/67; 398/68; 398/135; 398/91; 398/138; 398/83; 398/139; 398/79; 398/98; 398/75; 320/235; 320/236

(58) Field of Classification Search .............. 398/3, 398/7, 42, 48, 59, 67, 91, 139, 5, 135, 138, 398/79, 98, 75, 68, 83; 370/235–236  
See application file for complete search history.

(56) References Cited

U.S. PATENT DOCUMENTS 4,486,739 A   12/1984   Franaszek et al. ............ 341/59

(Continued)

FOREIGN PATENT DOCUMENTS

WO   PCT/US00/25089   1/2001

OTHER PUBLICATIONS

Tanenbaum, Andrew S., Computer Networks, 1996, Prentice Hall PTR, Third Edition, pp. 202-219.

(Continued)

*Primary Examiner*—Hahn Phan  
(74) *Attorney, Agent, or Firm*—Dougherty Clements; Christopher L. Bernard; Tyler S. Brown

(57) ABSTRACT

An optical fiber ring network includes a plurality of interconnected nodes, each pair of neighboring nodes being interconnected by a pair of optical links. Using coarse wavelength division multiplexing, data is transmitted in both directions over each link, using a first wavelength $\lambda 1$ to transmit data in a first direction over the link and a second wavelength $\lambda 2$ to transmit data in a second, opposite direction over the link. The two wavelengths $\lambda 1$ and $\lambda 2$ differ by at least 10 nm. Each of the data streams transmitted over the optical link has a bandwidth of at least 2.5 Gbps. Further, each data stream has at least two logical streams embedded therein. A link multiplexer at each node of the network includes one or more link cards for coupling the link multiplexer to client devices, and one or more multiplexer units for coupling the link multiplexer to the optical links. Each link card includes frame buffers capable of storing numerous Fiber Channel frames that are being transmitted to and from the client device(s) coupled to that link card. The link card also includes flow control logic for pre-filling the frame buffers with frames of data before the receiving client devices send flow control messages to request their transmission. The combined effect of the frame buffers and flow control logic is that the full bandwidth of the links can be utilized even when the network nodes are very far apart and the client devices have small input data buffers.

13 Claims, 14 Drawing Sheets

U.S. PATENT DOCUMENTS

| | | | |
|---|---|---|---|
| 4,866,704 A | 9/1989 | Bergman | 370/452 |
| 5,396,357 A | 3/1995 | Goossen et al. | 398/59 |
| 5,418,785 A | 5/1995 | Olshansky et al. | 370/438 |
| 5,526,155 A | 6/1996 | Knox et al. | 398/87 |
| 5,663,724 A | 9/1997 | Westby | 341/59 |
| 5,790,288 A | 8/1998 | Jager et al. | 398/75 |
| 6,023,359 A | 2/2000 | Asahi | 398/5 |
| 6,049,550 A | 4/2000 | Baydar et al. | 370/466 |
| 6,198,721 B1 * | 3/2001 | Mueller | 370/223 |
| 6,370,579 B1 | 4/2002 | Partridge | 709/226 |
| 6,400,730 B1 * | 6/2002 | Latif et al. | 370/466 |
| 6,466,591 B1 | 10/2002 | See et al. | 370/535 |
| 6,493,117 B1 | 12/2002 | Milton et al. | 398/49 |
| 6,718,139 B1 * | 4/2004 | Finan et al. | 398/59 |
| 2002/0010694 A1 | 1/2002 | Navab et al. | |

OTHER PUBLICATIONS

Wood, Thomas H. et al., Demonstration of a Cost-Effective, Broadband Passive Optical Network System, Apr. 1994, IEEE Photonics Technology Letters, vol. 6, No. 4, pp. 575-578.

InterOperability Lab: Tutorials and Resources, Fibre Channel, May 4, 1998, URL, http://www.iol.unh.edu/knowledgeBase/training/fc/fc_tutorial.html.

* cited by examiner

Physical signal paths from Node 1 to Node 2:
OL12-1;
OL12-2;
OL13-1, OL23-1;
OL13-2, OL23-2;

Exemplary Optical Communication System Deployment

Broken Fiber Failover

Failed Customer MUX Failover

Failed Head End MUX Failover

OPTICAL FIBER RING COMMUNICATION SYSTEM

This application is a Divisional of application Ser. No. 09/660,388, filed on Sep. 12, 2000, now U.S. Pat. No. 6,718,139, the entire contents of which are hereby incorporated by reference and for which priority is claimed under 35 U.S.C. § 120.

This appln claims the benefit of 60/153,519 filed on Sep. 13, 1999.

The present invention relates generally to optical fiber communication systems, and particularly to a system architecture for making efficient use of optical fiber communication rings and provided reliable logical connections between network nodes.

BACKGROUND OF THE INVENTION

Fiber optic rings have been installed, and as of 1999 are in the process of being installed in many cities. These communication networks have the potential to provide low cost, high bandwidth connections within a geographical area of several miles, as well as low cost, high bandwidth connections to other communication networks, such as the Internet. To date, however, the equipment available for providing data communications over these networks has been sufficiently expensive that relatively little use is being made of these fiber optic networks.

The present invention provides a low cost system architecture that allows Fibre Channel (FC) and Gigabit Ethernet (GE) data streams to be seamlessly routed through such fiber optic ring networks with very high reliability, all while making efficient use of the available bandwidth.

SUMMARY OF THE INVENTION

An optical fiber ring network includes a plurality of interconnected nodes, each pair of neighboring nodes being interconnected by a pair of optical fiber links. Using coarse wavelength division multiplexing, data is transmitted in both directions over each optical link, using a first optical wavelength $\lambda 1$ to transmit data in a first direction over the link and a second optical wavelength $\lambda 2$ to transmit data in a second, opposite direction over the link. The two optical wavelengths $\lambda 1$ and $\lambda 2$ differ by at least 10 nm.

In a preferred embodiment, each of the data streams transmitted over the optical link has a bandwidth of at least 2.5 Gbps. Further, each data stream has at least two logical streams embedded therein.

At each node of the network there is a link multiplexer that includes one or more link cards for coupling the link multiplexer to client devices, and one or more multiplexer units for coupling the link multiplexer to the optical links. Each link card includes frame buffers capable of storing numerous Fibre Channel frames that are being transmitted to and from the client device(s) coupled to that link card. The link card also includes flow control logic for pre-filling the frame buffers with frames of data before the receiving client devices send flow control messages to request their transmission. The combined effect of the frame buffers and flow control logic is that the full bandwidth of the links can be utilized even when the network nodes are very far apart and the client devices have small input data buffers.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
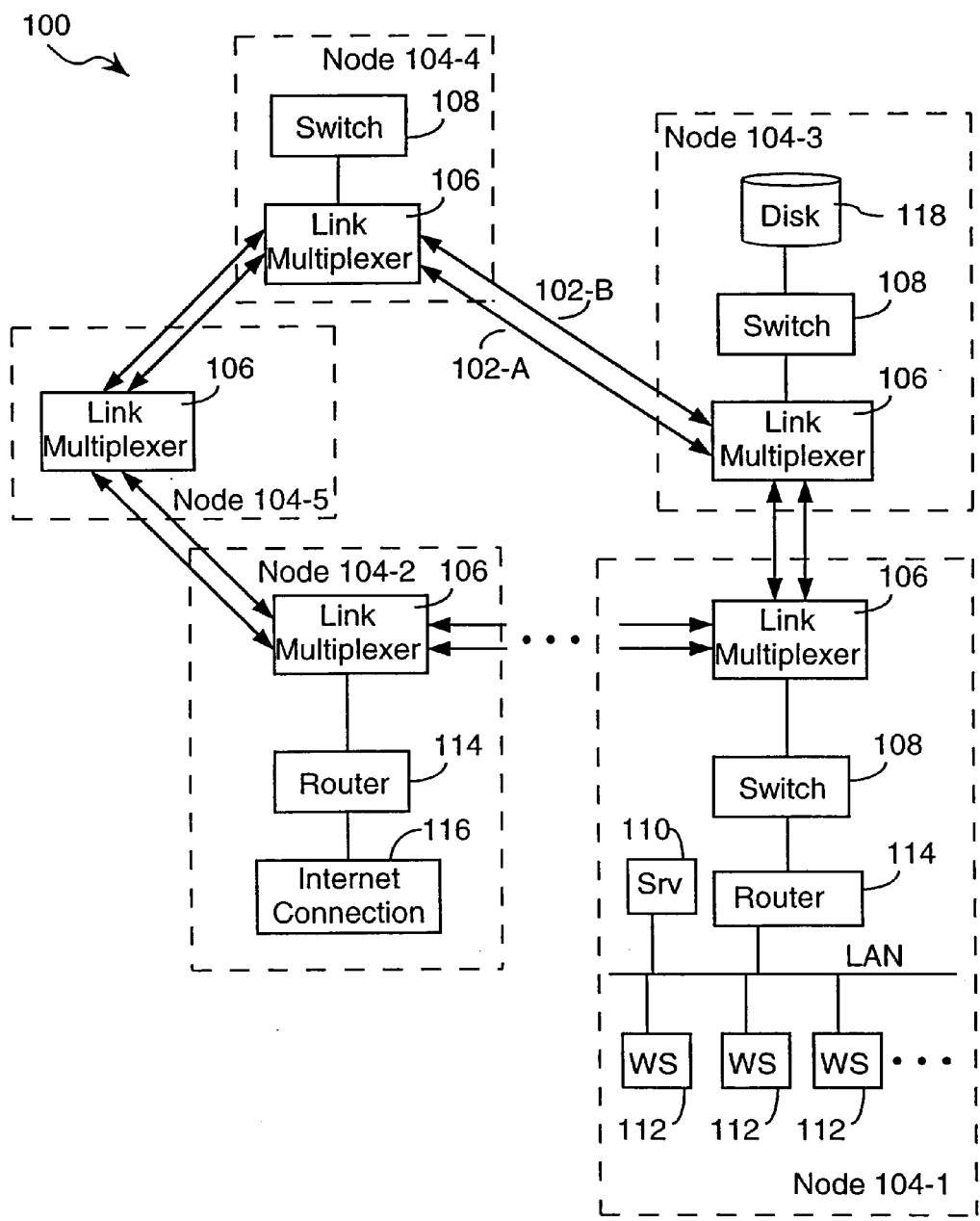
FIG. 1 is a block diagram a fiber optic ring network having a plurality of nodes that employ the present invention.

Referring to FIG. 1, there is shown a fiber optic ring network 100. The network includes a pair of fiber optic cables 102 that traverse a loop or ring. At each node 104 of the network, the fiber optic cables are segmented so that signals on the pair of fiber optic cables are received by the link multiplexer 106 at that node, and then either processed or forwarded to the next segment of the fiber 102.

The link multiplexers 106 perform numerous functions: forwarding signals from one optical fiber segment to the next, routing signals from the optical fiber cables to client devices or communication lines, and routing signals to the optical fiber cables from client devices or communication lines. The link multiplexers 106 also combine signals from multiple sources using time division and wavelength division techniques so as to transmit them over the fiber optic cables 102.

The link multiplexer 106 at each node 104 is typically coupled to other devices or communication lines via a switch or switch fabric 108. The switch 108 connects various devices and communication channels to the host (or client) side ports of the link multiplexer. The switches 108 are generally conventional switching devices and fabrics, such as time division multiplexed busses, and in some circumstances are not needed, and are therefore not described further in this document.

An example of a node 104-1 is a node that is coupled to a local area network (LAN). The LAN may, in turn, be coupled to any number of server computers 110 and end user workstations 112. The LAN may be coupled to link multiplexer 106 for the node 104 by a switch 108 and router 114, or perhaps just a router 114 if no other switching functionality is required.

A second example of a node 104-2 is one that provides an Internet connection 116 to the network 100, via a router 114 that is coupled to the link multiplexer 104-2.

Another example of a node 104-3 is one that contains a "disk farm" 118, which is generally a set of disks for providing centralized data storage used by devices coupled to other ones of the nodes 104. The present invention makes it practical for companies with buildings at multiple locations throughout a city or similar region to use centralized data storage. The speed of data access provided by the fiber optic network 100 is so high that there is little if any perceptible difference to end users between having data storage in each of the facilities as compared with having data storage at a single, central storage node on the ring network.

Multiple Physical Paths Between Each Pair of Nodes

Figure 2:
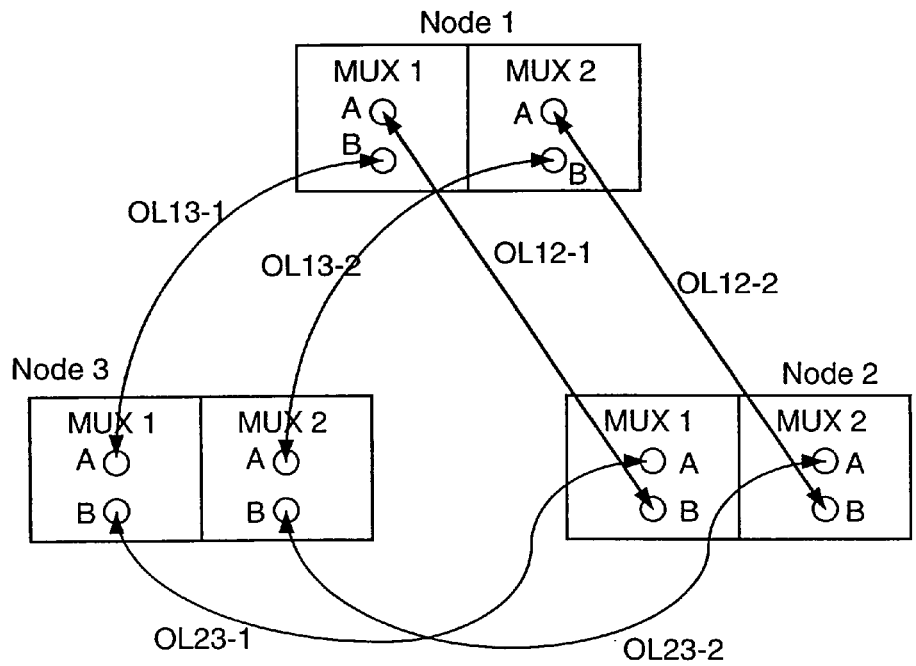
FIG. 2 is a block diagram showing multiple physical communication paths between network nodes.

Referring to FIG. 2, in a preferred embodiment, the link multiplexers 104 (FIG. 1) contain optical transceivers that both transmit and receive signals on each optical fiber 102. As a result, when two optical fibers are used with a physical transmit and receive channel on each fiber, there are four bidirectional communication paths between any two nodes of the network, so long as all the optical fiber cable segments are connected and intact. For example, the bidirectional physical signal paths between Node 1 and Node 2 are as follows: 1) OL12-1, 2) OL12-2, 3) OL13-1–OL23-1, and 4) OL13-2–OL23-2. Since there are four full bandwidth physical signal paths between each pair of nodes in the network, the impact of any single segment failure is much less severe than in prior art systems where there are just two physical signal paths between each pair of nodes. In such prior art systems, each optical fiber channel is used to send signals in only one direction.

The bidirectional signal paths on each optical fiber are formed using a particular type of "coarse wavelength division multiplexing." In particular, one optical wavelength is used to transmit a stream of data, while a second optical wavelength is used to receive a stream of data. Using "coarse" wavelength division multiplexing means that the optical wavelengths of the two optical signals are at least 10 nm apart (and preferably at least 20 nm apart) from each other. In a preferred embodiment, each optical fiber cable carries a first 2.5 Gbps data stream at 1510 nm, and a second 2.5 Gbps data stream at 1570 nm. The two data streams flow in opposite directions. Since two optical fiber cables are coupled to each link multiplexer, there are actually four optical fibers (i.e., four cable segments) that are coupled to the link multiplexer: two that are coupled to a first neighboring node on the ring and two that are coupled to a second neighboring node on the ring. For simplicity and ease of explanation, it will be assumed here that data flowing "clockwise" through the ring is transmitted at a first optical wavelength $\lambda 1$ (e.g., 1510 nm) and that data flowing "counterclockwise" through the ring is transmitted at a second optical wavelength $\lambda 2$ (e.g., 1570 nm). This is shown more specifically in the following table:

|  | Tx | Rx | Signal Paths |
| --- | --- | --- | --- |
| Mux1 Port A | $\lambda 1$ | $\lambda 2$ | OL12-1 |
| Mux1 Port B | $\lambda 2$ | $\lambda 1$ | OL13-1 |
| Mux2 Port A | $\lambda 1$ | $\lambda 2$ | OL12-2 |
| Mux2 Port B | $\lambda 2$ | $\lambda 1$ | OL13-2 |

As shown in FIG. 2, port A of Mux 1 in one node is always connected to port B of Mux 1 in a neighboring node, and similarly port A of Mux 2 in one node is always connected to port B of Mux 2 in a neighboring node. As a result, the $\lambda 1$ signals flow in one direction through the ring while the $\lambda 2$ signals flow in the opposite direction.

In another embodiment, four data signal signals are transmitted over each optical fiber cable segment, using four distinct transmission optical wavelengths, each separated from the others by at least 10 nm, and preferably separated from each other by 20 nm or more. In this embodiment, each link multiplexer uses four Mux units 142. In one implementation of this embodiment, the four optical wavelengths used are 1510 nm, 1530 nm, 1550 and 1570 nm.

In yet another embodiment, each data signal transmitted over the optical fiber cables transmits data at a speed of 5.0 Gbps or 10 Gbps, thereby doubling or quadrupling the bandwidth of the optical fiber ring, without increasing the number of optical fiber cables used.

Link Multiplexer Architecture

Figure 3:
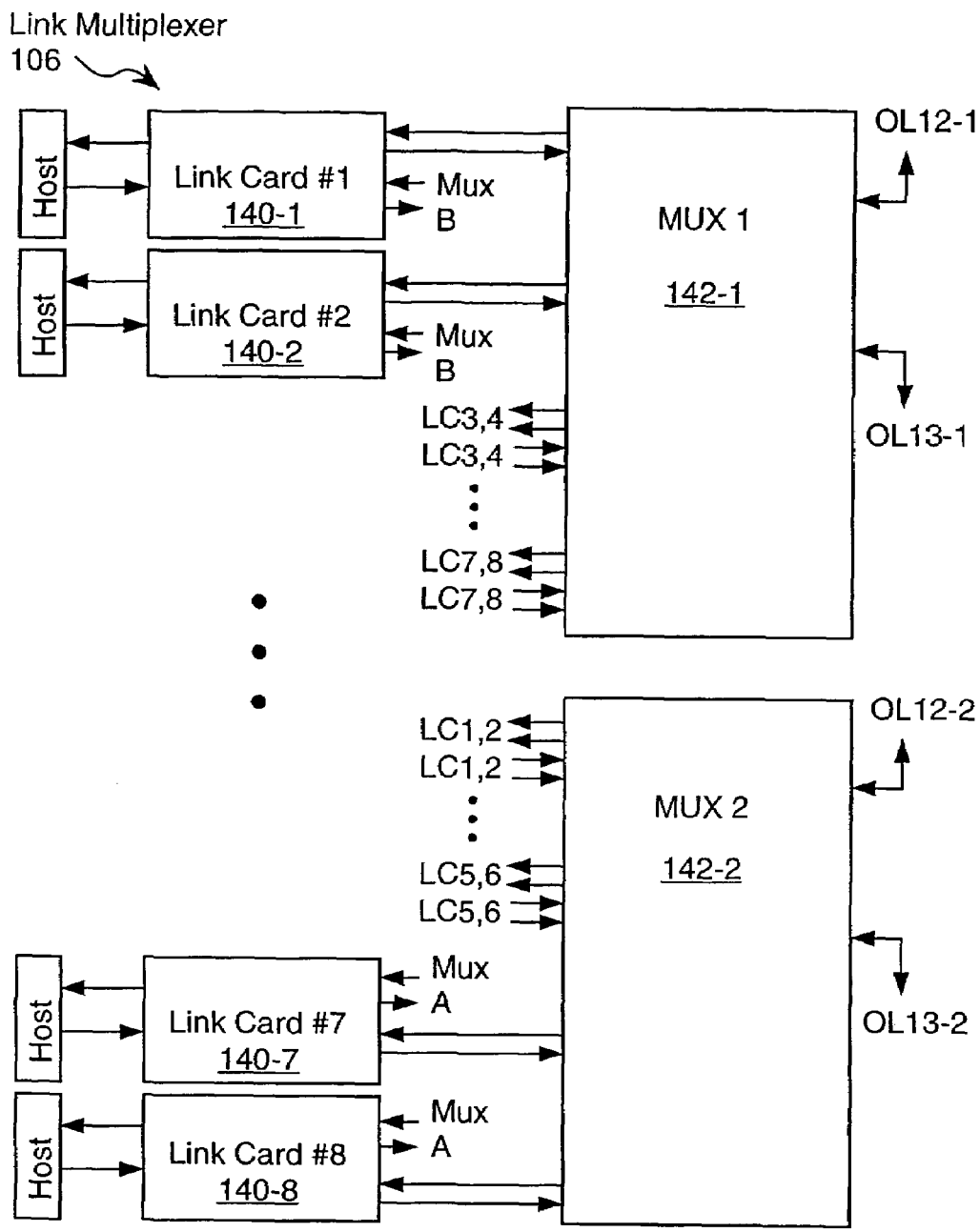
FIG. 3 is a block diagram of a link multiplexer, for use at any one node of the fiber optic ring network.

Referring to FIG. 3, there is shown a preferred embodiment of a link multiplexer 106. The link multiplexer 106 includes up to eight link cards 140, and two multiplexer units 142. Each link card 140 provides a high speed connection to a client device or communication channel. In a preferred embodiment two types of link cards are used: one for Fibre Channel connections, which operate at 1.0625 Gbps, and another for connections to Gigabit Ethernet channels, which operate at 1.25 Gbps. Internally, the link cards operate at 1.25 Gbps. In an alternate embodiment, the link cards and multiplexer units operate at a rate that is greater than 1.25 Gbps, such as 1.28 Gbps or 1.5 Gbps or even 2.0 Gbps. Additional types of link cards can be used to transmit and receive signals using other signal protocols, so long as the maximum data rate of the signals does not exceed the channel bandwidth of the link multiplexer (which is 1.25 Gbps in the preferred embodiment). The link cards 140 included in a link multiplexer 106 can include any combination of Fibre Channel and Gigabit Ethernet link cards (e.g., two FC link cards, or two GE link cards, or one of each, or four of each, and so on).

Each multiplexer unit 142 handles up to four full duplex, full bandwidth Fibre Channel (FC) or Gigabit Ethernet (GE) data streams. More specifically, each multiplexer can transmit as much as 5.0 Gbps of data, over two physical channels that each operate at 2.5 Gbps, and can receive as much as 5.0 Gbps of data, over two other physical channels that each operate at 2.5 Gbps.

Link Card

Figure 4:
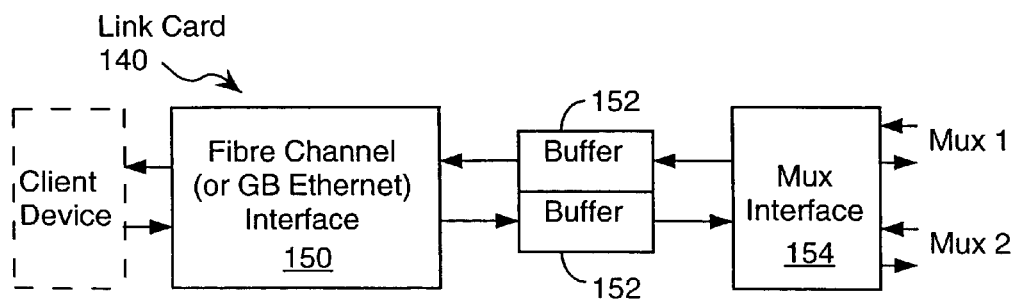
FIG. 4 is a block diagram of a link card, which is a component of the link multiplexer of FIG. 3.

Referring to FIG. 4, there is shown a functional block diagram of a link card 140. In particular, the link card 140 includes a Fibre Channel or Gigabit Ethernet interface 150 for coupling to a full duplex Fibre Channel or Gigabit Ethernet data stream. The interface 150 can also be used to couple to fractional data streams, in particular to half bandwidth data streams (operating at 0.503125 Gbps for Fiber Channel or 0.5125 Gbps for Gigabit Ethernet).

Two buffers 152 are used to buffer data being transmitted in each direction, in particular for providing retiming between the clock domains of the Mux units (i.e., Mux 1 and Mux 2) and the clock domains of client device(s). Finally, a Mux unit interface 154 is used to couple the link card to the two multiplexer units 142-1 and 142-2.

Figure 5:
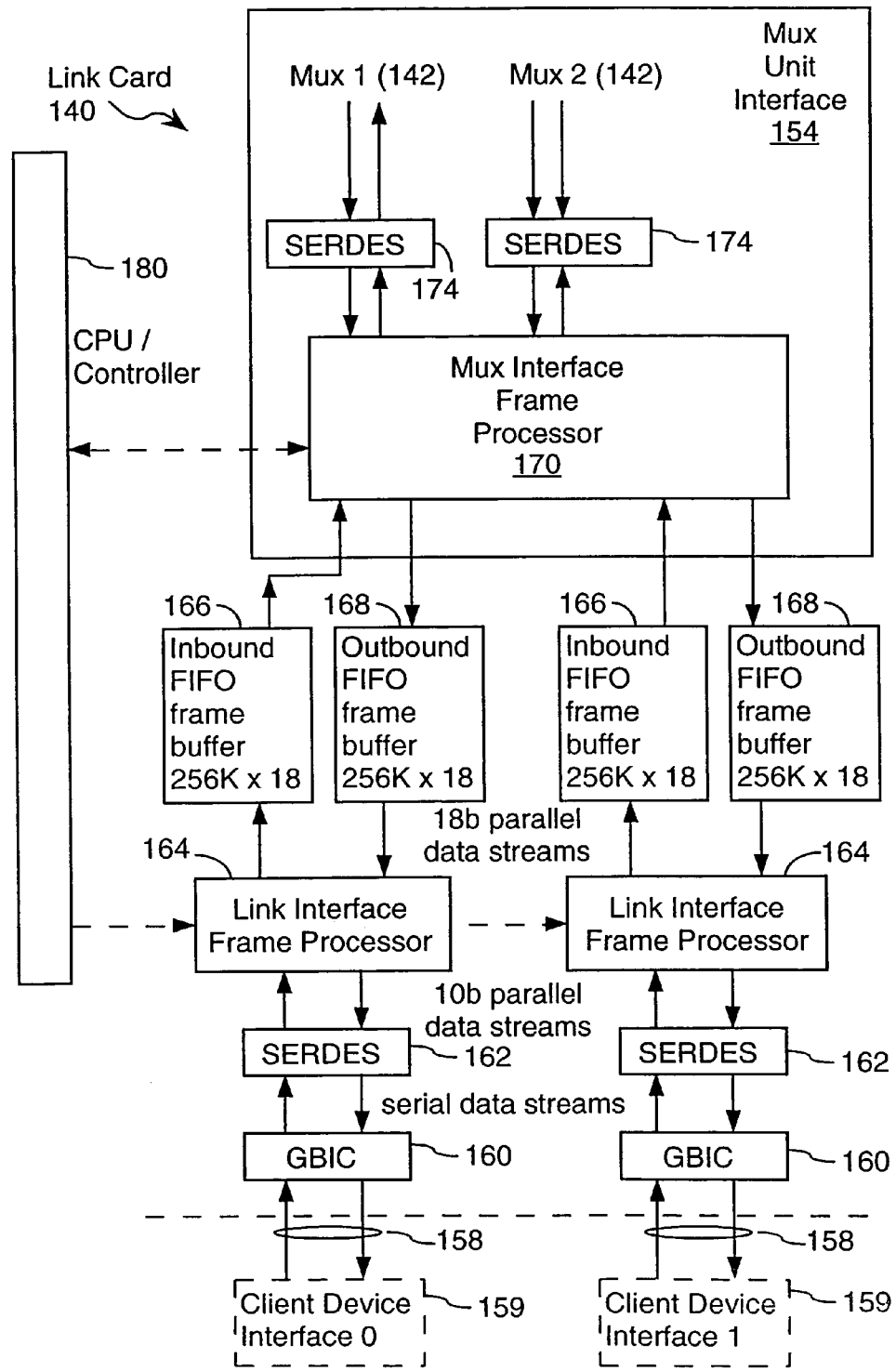
FIG. 5 is a detailed block diagram of a link card.

FIG. 5 shows a more detailed diagram of the link card 140, which will now be described starting with gigabit interface cards (GBIC's) 160 at the bottom of FIG. 5 and working upwards toward the Mux unit interface 154. The link card 140 includes a pair of GBIC's 160, each of which couples the link card 140 to a full duplex Fiber Channel or Gigabit Ethernet transmission media 158. The transmission media, which connects the client devices 159 (also sometimes called the host system or client communication channel) to the link card 140, is typically a coaxial cable or fiber optic cable. The GBIC's 160 transmit and receive serial data streams.

In order to describe the data flow in a consistent manner, the data stream from the Mux units 142 to the client devices is referred to as an outbound data stream, and the data stream in the opposite direction is referred to as an inbound data stream.

Each of the two GBIC's 160 is coupled to a respective link interface frame processor 164 by a respective serializer/deserializer (SERDES) circuit 162, such as the Vitesse VSC7125 (for Fibre Channel data streams running at 1.0625 Gbps) or the Vitesse VSC7135 (for Gigabit Ethernet data streams running at 1.25 Gbps). The SERDES 162 converts the inbound serial data stream received from the GBIC 160 into a 10-bit parallel data stream and transmits the converted data stream to the link interface frame processor 164. Also, the SERDES 162 converts a 10-bit parallel outbound data stream received from the link interface frame processor 164 into a serial data stream and transmits the converted data stream to the GBIC 160.

The link interface frame processor 164 decodes 10b symbols in the inbound data stream from the GBIC into 8b symbols, and encodes 8b symbols received from an outbound frame buffers 168 into 10b symbols suitable for transmission. The link interface frame processor 164 also controls the operation of an inbound frame buffer 166 and the outbound frame buffer 168.

A link card channel, which includes the GBIC 160, SERDES 162, link interface frame processor 164, and a pair of inbound and outbound FIFO (first-in-first-out) frame buffers 166,168, can operate in one of two modes under user control: distance buffering enabled or disabled. When distance buffering is disabled the data frames and flow control primitives are passed through the inbound and outbound frame buffers 166, 168 as quickly as possible. Whenever there is a data frame or flow control primitive in the outbound buffer 168, it is read from the buffer 168 and passed to the client device immediately through the link card channel. All data frames and flow control primitives received from the client device are written to the inbound frame buffer 166.

When distance buffering is enabled the link interface frame processor 164 receives and interprets flow control primitives received from the client device and then controls reading the data from the outbound frame buffer 168 as requested by the client device. The client device controls the reading of data from the outbound frame buffer 168 using flow control primitives. The flow control primitives are not passed through the buffers 166, 168 when distance buffering is enabled. Instead, the flow control primitives are consumed by the link interface frame processor 164. Similarly, when distance buffering is enabled, the link interface frame processor 164 generates flow control primitives to send to the client device based on the fullness of the inbound frame buffer 166. Furthermore, when distance buffering is enabled the Mux interface frame processor 170 generates and receives it's own flow control primitives that are sent to the link card(s) connected thereto. It should be noted that the buffers 166, 168 preferably do not overflow in normal operation with distance buffering either enabled or disabled.

The link interface frame processor 164 extracts "extra" Idle symbols (sometimes called "Idles") from the outbound data stream, storing only data frames and one Idle between data frames in the inbound FIFO frame buffers 166. Thus, if there are more than one Idle between data frames the extra ones are not stored in the inbound FIFO frame buffer 166. For the outbound data streams, the link interface processor 164 inserts as many Idles as may be needed to fill the space between data frames being transmitted to the client devices.

When the link interface frame processor 164 reads a link synchronization character from the outbound frame buffer 168, and the outbound frame buffer 168 is otherwise empty, link synchronization words are replicated until other data is received and stored in the outbound frame buffer 168. Each word stored in the frame buffers 166 and 168 includes a pair of 8-bit characters, a flag to indicate if the first character of the pair is a "K" character, and a parity bit, for a total of 18 bits. K characters are special symbols used for control, and thus are not ordinary data. Examples of K characters are Idles, flow control primitives, and begin of frame and end of frame symbols.

Each frame buffer 166, 168 is preferably large enough to store hundreds of Fibre Channel (FC) or Gigabit Ethernet frames. For example, in a preferred embodiment each frame buffer 166, 168 is sufficiently large to allow 240 full sized FC frames (of 2148 bytes each including headers, CRC and delimiters) to be stored. As a result, the link card 140 is able to accept from each data channel of the client device up to 240 full size Fiber Channel (FC) frames more than the next downstream device has indicated it is ready to accept.

The link interface processor 164 also translates protocol specific frame delimiters, idle Words, and link synchronization characters into generic counterparts that are sent through the rest of the fiber optic ring network 100. As a result, the operation of all components of the fiber optic ring network other than the link interface processors operate in a manner that is protocol independent. In the case of Fibre Channel link cards, the link interface processors translate 4 byte idles and link synchronization words into 2 byte generic versions, which are written to the inbound frame buffer 166. Similarly when the 2 byte generic versions of these symbols are read from the outbound frame buffer 168, they are converted back to the 4 byte Fibre Channel versions, with the reading of the outbound frame buffer paused as necessary to align data frames to the 4 byte boundaries.

The Mux unit interface 154 includes a Mux interface frame processor 170 that controls the flow of data between the frame buffers 166, 168 and the Mux units 142 (Mux 1 and Mux 2 of FIG. 3). The Mux interface frame processor 170 also decodes 10b symbols in the two data streams received from Mux 1 and Mux 2 into 8b symbols, and encodes 8b symbols received from the frame buffers 168 into 10b symbols suitable for transmission over optical fiber cables.

The Mux interface frame processor 170 handles flow control as follows. When distance buffering is disabled, the MUX interface frame processor 170 passes data frames and flow control primitives through the inbound and outbound frame buffers 166, 168 as quickly as possible. If a link card channel is in FC mode, the MUX interface frame processor 170 needs to wait for the inbound frame buffer 166 to collect enough (i.e., a predefined amount) of the FC frame before it starts transmitting the frame to the MUX 142 to avoid a buffer underrun condition. This is because the MUX unit interface 154 always operates at 1.25 Gbps and the FC link interface operates at 1.0625 Gbps. To avoid an underrun condition in FC mode, the MUX interface processor 170 waits until at least 384 bytes of an FC frame are in the inbound FIFO buffer 166 before starting to read the frame, or until that much time has elapsed to handle the case when the frame is less than 384 bytes in length. In the case of Gigabit Ethernet, there is no need to wait before starting to read the frame out of the buffer since the clock speeds of the client device and the Mux unit interface 154 are matched.

When a link card channel has distance buffering enabled, the MUX interface frame processor 170 executes a flow control protocol with the link interface frame processor 164 for that channel. For instance, if the outbound frame buffer 168 starts filling up, this condition is detected by the MUX interface frame processor 170, which responds by sending flow control signals to the MUX interface frame processor 170 in the "sending link card" (connected to the sending client device), which then stops sending frames over the fiber optic network, leaving them in the sending link card's inbound frame buffer 166. Once the outbound frame buffer 168 starts clearing (i.e., the receiving client device accepts enough frames to bring the outbound frame buffer's fullness below a predefined level), the MUX interface frame processors 170 in the sending and receiving link cards will exchange flow control messages (using flow control primitives) and allow the data frames to start flowing again.

When link synchronization characters are received, only one of them is stored in the inbound FIFO frame buffer 166. The Mux interface frame processor 170, when reading data from the inbound FIFO frame buffer 166, replicates the link synchronization characters and/or Idles, for as many times as may be needed to fill the data stream being sent downstream.

The Mux unit interface 154 draws data from the inbound frame buffer 166 and sends it to the Mux units 142 at a fixed rate for so long as the Mux units 142 are able to accept data and there is data in the inbound frame buffer 166 to be sent. In the outbound direction, the Mux unit interface accepts data from the Mux units 142 as long as the outbound frame buffer 168 has room to store at least one additional full size frame (e.g., 32 k bytes for Gigabit Ethernet frames), and stops accepting data (i.e., new frames of data) from the Mux units 142 once the outbound frame buffer 168 passes that predefined fullness mark.

The Mux interface frame processor 170 is coupled to each of the two multiplexers Mux 1 and Mux 2 (142) by a respective serializer/deserializer (SERDES) circuit 174 such as the Vitesse VSC7135. The SERDES 174 converts the serial data stream from a multiplexer 142 into a 10 bit parallel data stream that is transmitted to the Mux interface frame processor 170, and converts a 10 bit parallel data stream received from the Mux interface frame processor 170 into a serial data stream that is transmitted to one of the Mux units 142.

In the preferred embodiment, the Mux interface frame processor 170 is statically configured by the user to route data to and from client device interface 0 from and to one of the MUX's (i.e., either MUX 1 or MUX 2). Client device interface 1 data then would be routed to and from the other MUX (142) not being used by client device interface 0.

In an alternate embodiment, or an alternate configuration of the preferred embodiment, the MUX interface frame processor 170 is configured to route frames from both client interfaces 159 to the same MUX 142 and the frames would be specially tagged so they could be sent out to appropriate client device, via the appropriate client device interface at the other end of the link. The other MUX 142 would then be used for failover, in case there is a failure in a hardware component in the original path. Routing frames from both device interfaces 159 to the same MUX is particularly useful when the frames have been compressed by the link interface frame processors 164 (i.e., in embodiments in which the link interface frame processors 164 include data compression circuitry).

Each link card 140 also includes a CPU or controller 180 for controlling the operation of the link card 140, and, in particular, for configuring the data paths through the link card 140 and for initializing the link card 140 upon power up, reset, or a change in the data channel configuration of the system that changes the data paths through the link card 140.

In some preferred embodiments, the link interface frame processor 164 further performs data compression and decompression functions, compressing outbound data streams using a predefined data compression and decompressing inbound data streams using a corresponding decompression method. Numerous appropriate data compression methods are well known to those skilled in the art, and thus are not described here. By using a data compression method that, on average, achieves at least 2:1 data compression, the bandwidth of the system can be doubled.

Mux Interface Frame Processor

Figure 6:
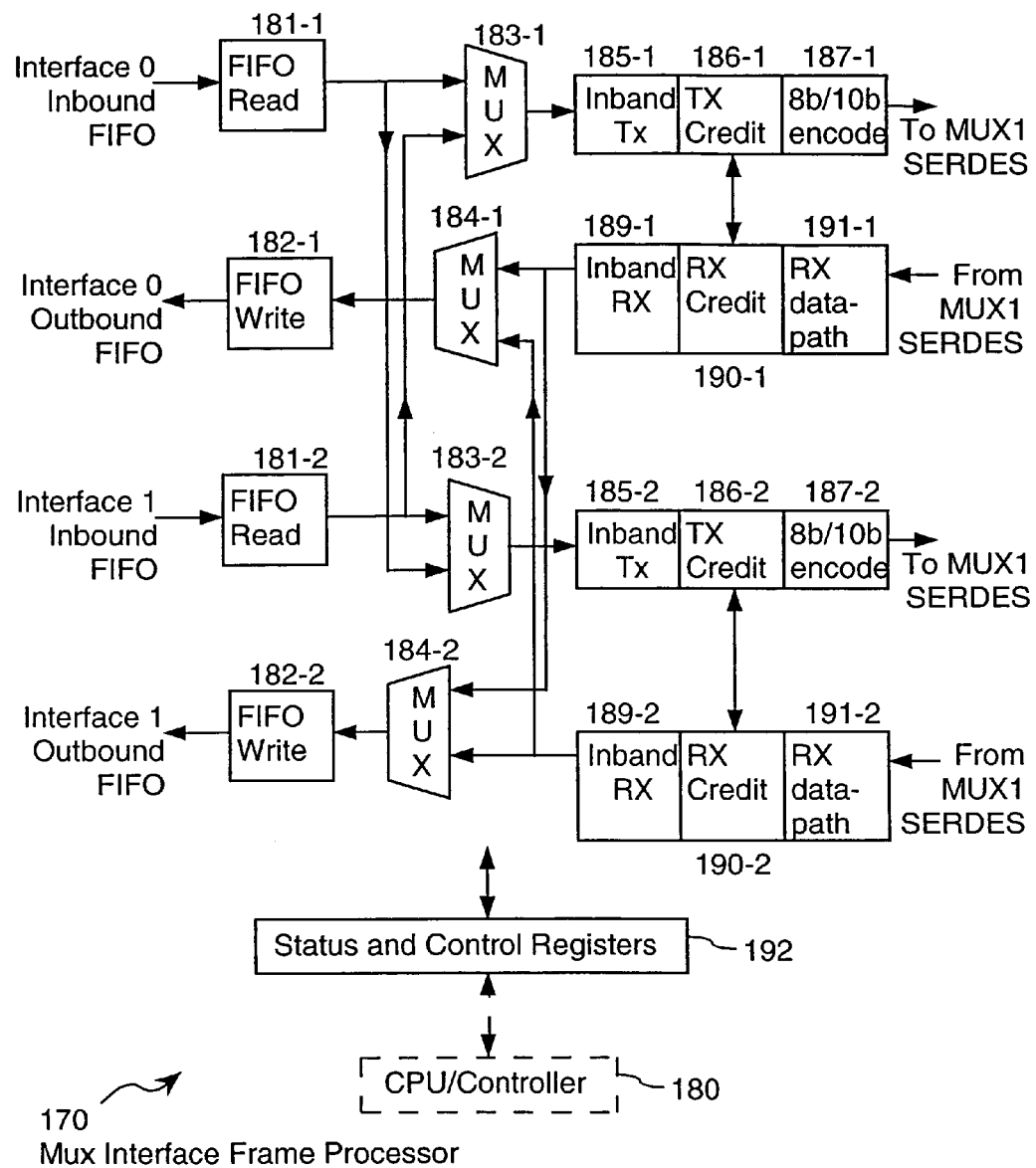
FIG. 6 is a block diagram of a Mux Interface Frame Processor, which is a component of the link card of FIG. 5.

FIG. 6 illustrates a block diagram of the Mux interface frame processor 170. The Mux interface frame processor 170 includes a pair of FIFO read circuits 181: a first FIFO read block 181-1 provided for the interface 0 inbound FIFO and a second FIFO read block 181-2 provided for the inbound interface 1. Each FIFO read circuit 181-1, 181-2 is configured to control the reading of the corresponding inbound FIFO frame buffer 166 (FIG. 5). If there is nothing (i.e., no packets, and no other data other than idles or link initialization primitives) in the buffer 166, then the FIFO read circuit will repeatedly output the most recently read link initialization word or Idle word. Each FIFO read circuit 181-1, 181-2 also holds off reading from its corresponding inbound FIFO 166 if the corresponding Inband Tx circuit 185-1 or 185-2 is processing a pending request or if the corresponding Rx Credit logic 190-1 or 190-2 is enabled and indicates there is no credit available. In FC mode the FIFO read circuit 181 delays reading a packet from the inbound FIFO until enough of the frame is present to ensure that an underrun will not occur (as already discussed above).

The pair of FIFO read circuits 181-1, 181-2 are coupled to a pair of multiplexors 183-1, 183-2 configured to allow Interface 0 to be statically connected to MUX 1 or MUX 2 and Interface 1 to be connected to the other MUX. As indicated earlier, this MUX configuration can be enhanced to allow the data streams from both client devices interfaces to be blended and routed through a single MUX 142 (MUX 1 or Mux 2), for instance during failover.

Subsequent to each MUX, the Mux interface frame processor 170 also includes a series of circuits blocks: an Inband Tx circuit 185, a TX credit circuit 186 and a 8b/10b encoder 187.

Each Inband Tx circuit 185 includes registers to hold a pending Inband frame that the onboard CPU 180 wishes to send and arbitration logic to send the Inband frame when the FIFO Read circuit 181 signals that there is a gap between the inbound frames being transmitted through the Mux interface frame processor. Inband frames are periodically transmitted by the link card 140. The Inband frames are removed from the data stream by the Inband Rx circuit 189 in the receiving link card, which sends the received Inband frames to that link card's local CPU/controller 180 for processing. In this way the CPU's 180 on the two link cards at the two ends of a communication channel can send messages (i.e., in Inband frames) back and forth to check on the functionality of the channel and to coordinate user settings (i.e., to make sure the user settings, including the user setting indicating whether distance buffering is enabled or disabled, are the same) and the like.

Each Tx Credit circuit block 186 is configured to insert link credit words onto the link instead of Idles when distance buffering is enabled and there is room in the outbound frame buffer 168 (FIG. 5) to store an additional packet, taking into account all previously sent link credit words.

Each 8b/10b encoder 187 is configured to encode the 16 data bits and 1-bit k-character flag read from the FIFO into two 10 bit characters and to send the resulting 20 bit word to the SERDES 174.

The data receiving circuitry of the Mux interface frame processor 170 includes a cascading chain of three circuit blocks for each receive channel: an Rx DataPath circuit 191, an RX Credit circuit 190 and an Inband Rx circuit 189. The Rx DataPath circuit 191-1 is substantially identical to the Rx DataPath circuit 191 in the TDM smoother in MUX 1 and MUX 2, and will be discussed below with respect to FIG. 11. The Rx Credit circuit 190 strips link credit words from the data stream and for each such link credit word adds to the available storage credit, if distance buffering is enabled. The storage credit accumulated by the Rx Credit circuit 190 indicates how many data frames the corresponding FIFO read circuit 181 can read from its inbound FIFO and send down the channel to the link card on the other side of the channel. As indicated above, the Rx Inband circuit 189 strips inband frames from the data stream and stores them for reading by the link card's local CPU 180.

A pair of outbound multiplexors 184-1 and 184-2 are configured to allow MUX 1 to be statically connected to client device Interface 0 or Interface 1 and MUX 2 to be connected to the other Interface. As stated above, this MUX configuration can be enhanced to allow the data streams from both client devices interfaces to be blended and routed through a single MUX 142 (MUX 1 or Mux 2).

The output of each multiplexors 184 is sent to a FIFO Write circuit 182, which writes received frames to the outbound FIFO frame buffer 168 (FIG. 5) and also writes link initialization words and Idles to the buffer 168 when they are different from the immediately preceding words in the data stream.

The Mux interface frame processor 170 further includes Status and Control Registers 192, which are a set of registers that are readable and/or writeable by the link card's local CPU 180 in order to monitor and control the Mux interface frame processor.

Link Interface Frame Processor

In a preferred embodiment, each communication channel is either in Fibre Channel (FC) mode or Gigabit Ethernet (GE) mode. As more protocols come into common usage, the number of such modes will increase. A different version of the link interface frame processor 164 (FIG. 5) is provided for use with client devices transmitting and receiving data in each mode. A FC link interface frame processor depicted in FIG. 7 is provided for FC mode, and a GE link interface frame processor depicted in FIG. 8 is provided for GE mode.

FC Link Interface Frame Processor.

Figure 7:
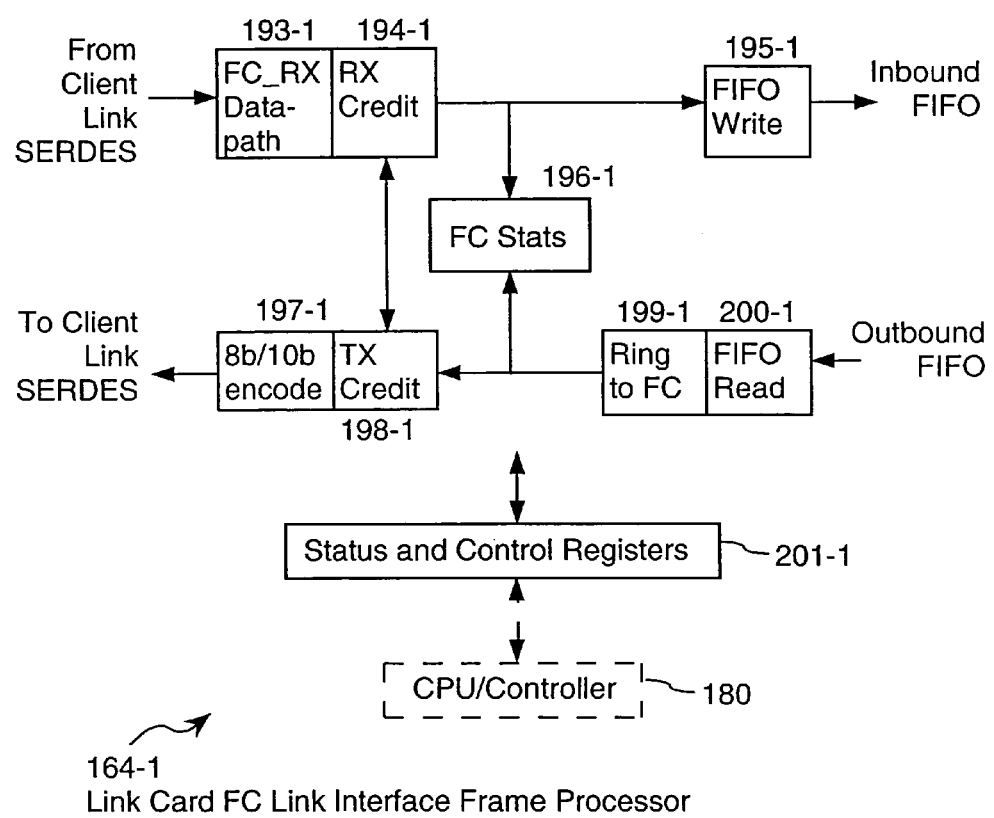
FIG. 7 is a block diagram of a link card FC Link Interface Frame Processor, which is a component of the link card of FIG. 5.
Figure 8:
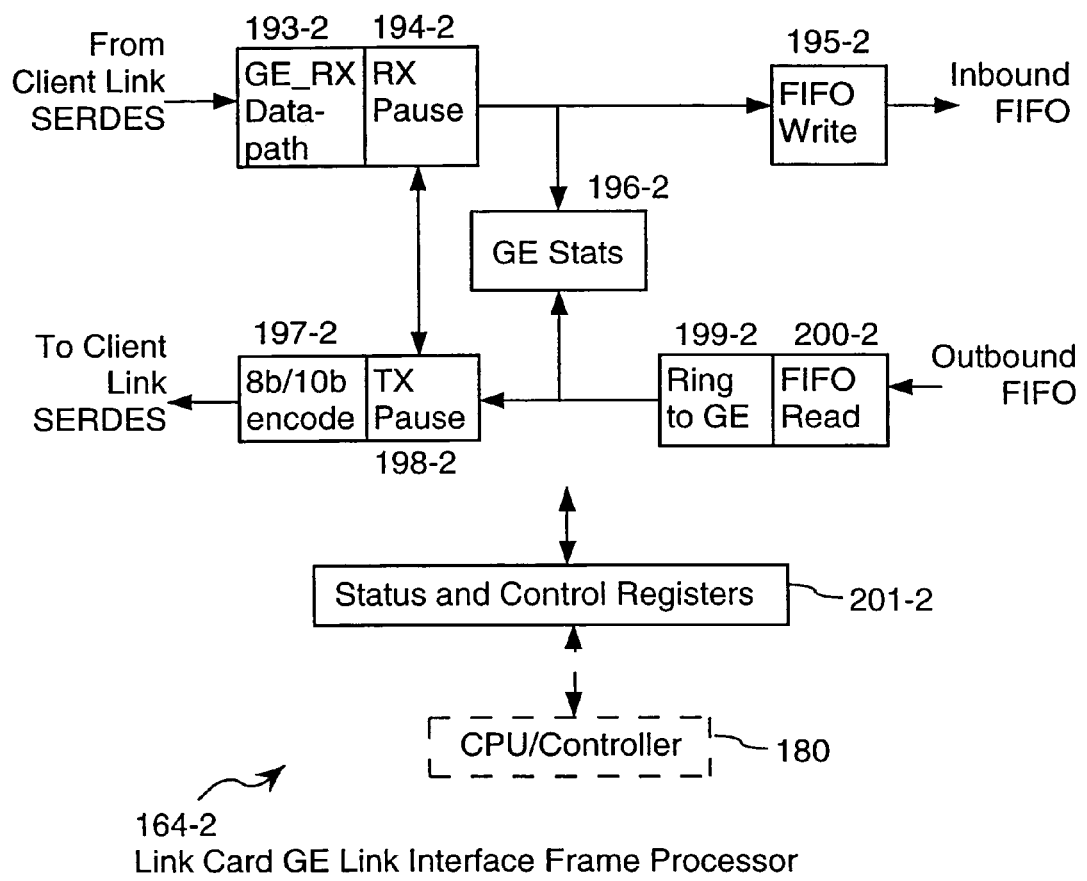
FIG. 8 is a block diagram of a link card GE Link Interface Frame Processor, which is a component of the link card of FIG. 5.

Now referring to FIG. 7, the FC Link Interface Frame Processor 164-1 includes an FC Rx DataPath circuit 193-1 that is substantially similar to the RX DataPath circuit (described below with respect to FIG. 11) used in the Mux TDM-Smoother of the Mux interface frame processor. However, the RX DataPath circuit 193-1 has additional logic at its front end to convert 4 character FC idle and link initialization words to predefined 2 character generic counterparts. These counterpart symbols are used only internal to the fiber optic ring network (i.e., within the link cards 140, MUX's 142 and the fiber optic cables).

The FC link interface frame processor 164-1 further includes:

An Rx Credit circuit 194-1 that strips link credit words (RRDY) from the data stream and for each such link credit word adds to the available storage credit, if distance buffering is enabled.

A FIFO Write circuit 195-1 that writes received frames to the inbound FIFO frame buffer 166 (FIG. 5) and writes link initialization words and idles to the FIFO when they are different from the immediately preceding words in the data stream.

A FIFO Read circuit 200-1 that controls the reading of data frames from the outbound FIFO frame buffer 168 (FIG. 5). If there is nothing in the outbound FIFO frame buffer, then the FIFO Read circuit 200-1 will repeatedly output the most recently read link initialization or idle word. If distance buffering is enabled, the FIFO Read circuit furthermore holds off reading data frames from the FIFO if no data frame credits are available.

A ring to FC conversion circuit 199-1 that converts 2-character generic idle and link initialization words into their standard FC 4-character counterparts.

A Tx Credit circuit 198-1 that inserts link credit words onto the link instead of Idles when distance buffering is enabled and there is room in the inbound FIFO frame buffer 166 to store an additional data frame, taking into account previously send link credit words (see later section on distance buffering for details).

An 8b/10b encoder 197-1 that is configured to encode the 16 data bits and 1-bit k-character flag read from the outbound FIFO frame buffer 168 into two 10 bit characters and to send the resulting 20 bit word to the SERDES 162 (FIG. 5).

An FC Statistics circuit 196-1 that includes logic to maintain statistics on one Fibre Channel Link. Several modes of operation are supported to provide users detailed protocol specific information, for instance packet counts, error counts, counts of various specific types of K characters, and so on.

Status and Control Registers 201-1, which are a set of registers that are readable and/or writeable by the link card's local CPU 180 in order to monitor and control the link interface frame processor 164-1.

GE Link Interface Frame Processor.

Referring to FIG. 8, the GE Link Interface Frame Processor 164-2 is used on link cards that couples the client devices using Gigabit Ethernet to the fiber optic network. The GE/IFP 164-2 includes an FC GE DataPath circuit that is substantially similar to the RX DataPath circuit (described below with respect to FIG. 11) used in the Mux TDM-Smoother of the Mux interface frame processor. However, the RX DataPath circuit 193-1 has additional logic at its front end to convert GE idle words into predefined 2 generic counterparts. In addition the delimiters framing Gigabit Ethernet frames are modified to a generic format. These counterpart symbols are used only internal to the fiber optic ring network (i.e., within the link cards 140, MUX's 142 and the fiber optic cables).

The GE link interface frame processor 164-2 further includes:

RxPause logic circuit 194-2 strips Pause frames from the data stream and starts a pause timer, internal to the link card, if distance buffering is enabled.

A FIFO Write circuit 195-1 that writes received frames to the inbound FIFO frame buffer 166 (FIG. 5) and writes link initialization words and idles to the FIFO 166 when they are different from the immediately preceding words in the data stream.

A FIFO Read circuit 200-1 that controls the reading of data frames from the outbound FIFO frame buffer 168 (FIG. 5). If there is nothing in the outbound FIFO frame buffer, then the FIFO Read circuit 200-1 will repeatedly output the most recently read link initialization or idle word. If Rx Pause logic (which is used in conjunction with distance buffering) is enabled, the FIFO Read circuit furthermore holds off reading data frames from the FIFO if the Rx Pause logic circuit 194-2 indicates that transmission should be paused.

A ring to GE conversion circuit 199-2 that converts 2-character generic idle into Gigabit Ethernet idle words, and generic frame delimiters back into Gigabit Ethernet frame delimiters.

A Tx Pause circuit 198-2 generates and inserts into the outbound data stream a Pause frame when distance buffering is enabled and the inbound FIFO frame buffer 166 is at least half full. The FIFO fullness threshold level for generating a Pause frame may differ in other embodiments. See the discussion on distance buffering, below, for details.

An 8b/10b encoder 197-2 that is configured to encode the 16 data bits and 1-bit k-character flag read from the outbound FIFO frame buffer 168 (FIG. 5) into two 10 bit characters and to send the resulting 20 bit word to the SERDES 162 (FIG. 5).

A GE Statistics circuit 196-2 that includes logic to maintain statistics on one Gigabit Ethernet Channel Link. Several modes of operation are supported to provide users detailed protocol specific information, for instance packet counts, error counts, counts of various specific types of K characters, and so on.

Status and Control Registers 201-2, which are a set of registers that are readable and/or writeable by the link card's local CPU 180 in order to monitor and control the link interface frame processor 164-2.

Multiplexer Units

Figure 9:
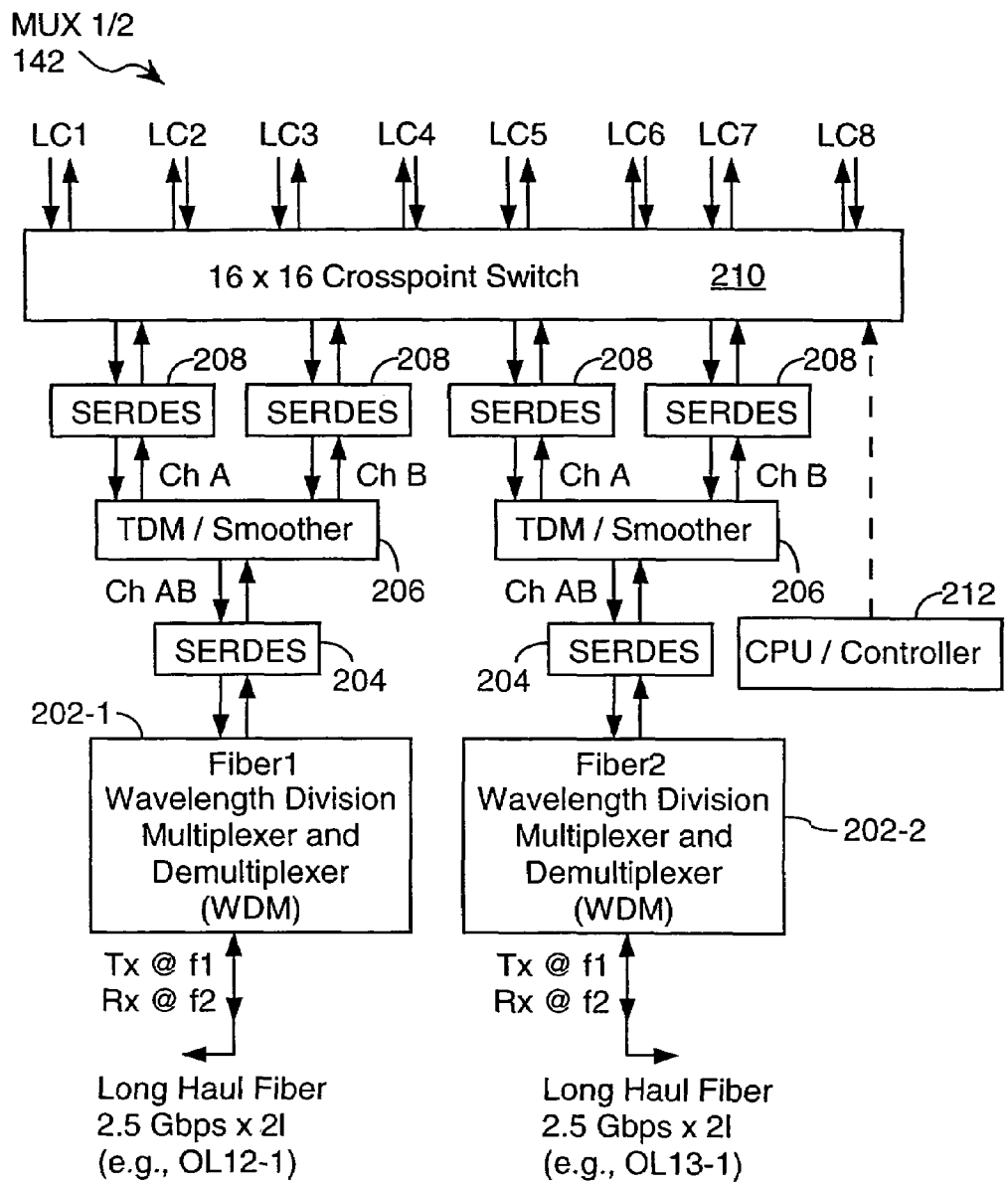
FIG. 9 is a block diagram of a multiplexer unit, which is a component of the link multiplexer of FIG. 3.

Referring to FIG. 9, each Mux unit 142 includes a pair of wavelength division multiplexer and demultiplexer circuits (WDM) 202-1, 202-2, each of which is coupled at one end to a respective optical fiber cable segment, for example OL12-1 and OL13-1. Each of the WDM's 202-1, 202-2 includes an optical signal receiver for receiving and demodulating signals at a first optical wavelength and an optical signal transmitter for transmitting signals at a second optical wavelength. More specifically, in a preferred embodiment the first WDM 202-1 transmits at the same optical wavelength $\lambda 1$ that the second WDM 202-2 receives, and receives at the same optical wavelength $\lambda 2$ that the second WDM 202-2 transmits. In an alternative embodiment, each Mux unit 142 is configured to handle four wavelengths over eight channels. The four wavelength—eight channel card has twice as many SERDES 208, TDM/Smoother 206 and SERDES 204 circuits compared with two wavelength—four channel Mux depicted in FIG. 9. The four additional SERDES 208 are connected to the crosspoint switch 210. Two SERDES 204 are then connected to each of its Fiber1/WDM and Fiber2/WDM circuits. Fiber1/WDM then transmits at wavelengths $\lambda 1$ and $\lambda 3$, and receives at wavelengths $\lambda 2$ and $\lambda 4$. Fiber2/WDM transmits at wavelengths $\lambda 2$ and $\lambda 4$, and receives at wavelengths $\lambda 1$ and $\lambda 3$.

Each of the data signals received and transmitted by the WDM's 202-1, 202-2, both on the optical side and on the electrical (internal) side are 2.5 Gbps serial data signals in the preferred embodiment. In other embodiments, other data transmission rates may be used, such as 5.0 Gbps or 10 Gbps.

Each WDM 202 is coupled to a respective time division multiplexer and smoothing circuit (TDM smoother) 206 by a respective serializer/deserializer (SERDES) circuit 204, such as the Vitesse VSC7146 (for data streams running at 2.5 Gbps). Each SERDES 204 converts the 2.5 Gbps serial data stream from its respective WDM 202 into a 20 bit parallel data stream that is transmitted to the TDM smoother 206 to which it is coupled, and converts a 20 bit parallel data stream received from the TDM smoother 206 into a serial data stream that is transmitted to the WDM 202.

The TDM smoother 206 performs a number of functions, including retiming of signals between clock domains, the multiplexing of data streams from two 1.25 Gbps channels into a single 2.5 Gbps data stream, and the demultiplexing of data streams from a 2.5 Gbps data stream into two 1.25 Gbps channels. The TDM smoother 206 is described in more detail below, with reference to FIGS. 10 and 11.

Still referring to FIG. 9, the TDM smoother 206 internally uses 20b parallel data streams. On its Channel AB interfaces (which are coupled to the WDM's 202) it outputs and receives 20b parallel data streams. On its Channel A and Channel B interfaces, which are coupled to a crosspoint switch 210, the TDM outputs 10b parallel data streams. A pair of SERDES circuits 208, such as the Vitesse VSC7135, are coupled to the switch side of each TDM to convert the 10b, 125 MHZ, data streams going to and from the switch side TDM interface into 1.25 GHz (i.e., 1.25 Gbps) serial data signals that are transmitted to and from the crosspoint switch 210. In a preferred embodiment, the crosspoint switch 210 is a 16×16 crosspoint switch, such as the Triquint TQ8017 1.25 Gbps 16×16 digital crosspoint switch. There is one crosspoint switch 210 in each Mux unit 142.

The 2.5 Gbps signal received by the Mux unit 142 from each optical fiber cable includes two 1.25 Gbps data signals, which in turn may be sub-divided into two or more logical signals. Each 1.25 Gbps data signal is considered to be a separate logical channel, and each such channel may be either an FC channel or a GE channel. The two data channels on a single optical fiber cable may be an two FC channels, two GE channels, or one FC channel and on GE channel.

Since FC and GE data streams are both converted into a generic data stream that is protocol independent, the two data channels within each 2.5 Gbps signal can be any combination of underlying data streams.

If an entire 1.25 Gbps data signal is to be forwarded by a network node to a next network node, that data stream is routed from a first optical fiber cable up through a WDM 202 and TDM smoother 206 to a crosspoint switch port, through the crosspoint switch to a second switch port, down through the other TDM smoother 206 and WDM 202 of that multiplexer unit, and back out onto a second optical fiber cable for transmission to the next network node.

Each Multiplexer unit 142 includes a CPU or controller 212 for configuring the switch 210 and keeping track of the status of the TDM smoothers 206 and WDM's 202.

TDM Smoother Circuit

Figure 10:
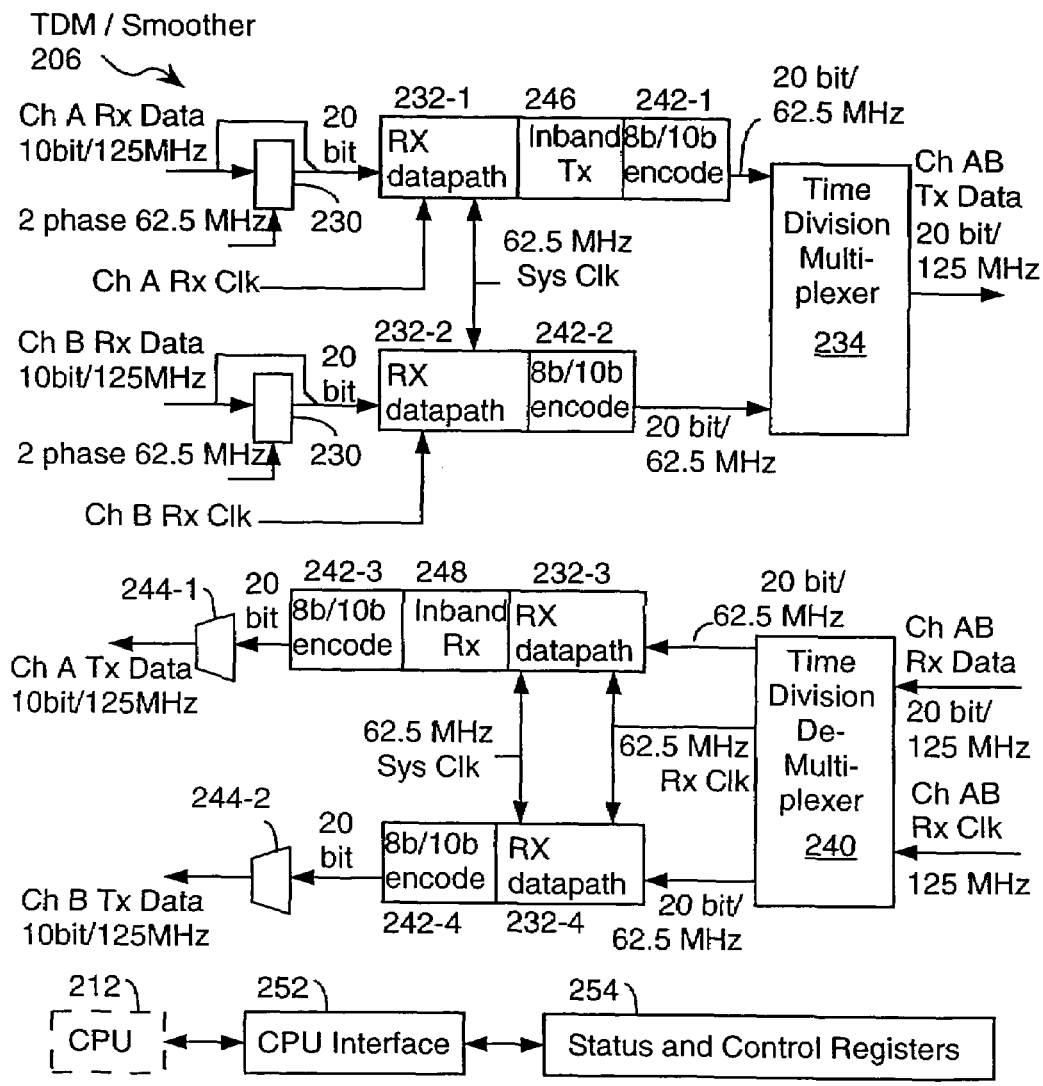
FIG. 10 is a block diagram of a time division multiplexer and transmission rate smoothing circuit, which is a component of the multiplexer unit of FIG. 6.

FIG. 10 shows a more detailed diagram of the TDM smoother circuit 206. The left side of the diagram represents the switch side interface between the TDM smoother 206 and the SERDES circuits 208 (FIG. 9), while the right side of the diagram represents the WDM side interface between the TDM and the SERDES circuits 204 (FIG. 9). The inbound data path through the TDM smoother 206 converts the Channel A and Channel B Rx data streams into a combined Channel AB Tx data stream, while the outbound data path through the TDM smoother 206 converts the Channel AB Rx data stream received from a WDM circuit into a pair of Channel A and Channel B Rx data streams.

In order to explain the operation of the TDM smoother 206, some background information is required. Regardless of the protocol of the signals received by the link cards 140 of the link multiplexer 106 (FIG. 3), the incoming data is converted by the link cards into a 1.25 Gbps stream that has frames of "encapsulated" data (i.e., surrounded by special start and end frame characters). Each frame of data that is transmitted through the link multiplexer begins and ends with a special 20-bit encapsulation character. In addition, the link multiplexer transmits 20-bit flow control characters between link cards to stop and start the flow of frames between the FIFO frame buffers in the link cards.

Data characters, which are 10-bits each, are transmitted through the link multiplexer in pairs in 20-bit chunks. Thus the basic unit of transmission in the link multiplexer, both for data and control characters, is 20-bits long.

The set of predefined 20-bit control characters used in the link multiplexer of the preferred embodiment includes, but is not limited to the following:
frame encapsulation characters (start and end of frame);
flow control characters (ready to receive an additional frame);
link initialization characters, used to establish data paths through the link multiplexer 106;
"Internal Violation" (VIO) characters, used to indicate the presence of invalid words in the middle of a frame;
"Internal Not Operational Sequence" (NOS) characters, used to indicate a lack of synchronization; and
Idle characters, which are transmitted whenever there are no data or other characters to be transmitted over any of the communication channels in the link multiplexer.

Each of the special 20-bit characters used in the link multiplexer consists of a predefined K28.5 10-bit character, followed by a 10-bit character specific code. The K28.5 character is the "special" character most commonly used in Fibre channel and Gigabit Ethernet to denote control characters, as opposed to data characters. It is an ideal character because it has a predefined "comma" bit pattern ("0011111") used by deserialization circuits to align received bit streams to word boundaries.

Another special character, called the K28.1 character, also contains the comma bit pattern. When combining two or more data streams for transmission over an optical fiber cable, the link multiplexer marks a first one of the data streams by replacing all its K28.5 characters with the K28.1 character, which enables the receiving device to separate out and properly identify the different logical data streams with the received physical data stream.

The two inbound data paths each begins with a latch 230 that stores every second 10-bit character, which is then combined with the immediately following 10-bit characters to form a stream of 20-bit characters. The 20-bit characters are transmitted through an Rx DataPath circuit 232-1 or 232-2 to a time division multiplexer (TDM) 234. The Rx DataPath circuit 232 is described in more detail below with reference to FIG. 12.

The TDM 234 combines the Channel A and Channel B data streams using strict alternation. That is, it alternates between transmitting a 20-bit character from Channel A and a 20-bit character from Channel B. For instance, on even numbered clock cycles Channel A data is selected by the TDM 234 for transmission, and on odd numbered clock cycles Channel B data is selected by the TDM 234 for transmission.

In order for a device at the receiving end to know which cycle is the even cycle and which is the odd cycle, the TDM 234 replaces all the K28.5 characters in Channel A with K28.1 characters. In an alternate embodiment, in which multiple logical channels (Channel A through Channel n) are combined by the TDM 234 into a single signal for transmission over an optical fiber cable, the TDM 234 marks a first one of the logical channels by replacing its K28.5 characters with K28.1 characters, which enables the receiving device to identify all the logical channels within the received signal. The K28.5 characters in all the other logical channels are left unchanged.

Since every link multiplexer 106 in the system uses identical multiplexer units, all the data streams transmitted over the optical fiber cable segments use the same marking scheme for distinguishing between a first subchannel within each data stream and the other subchannel(s) in the same data stream. Since the 20-bit data streams are combined "blindly," there can be "false commas" straddling the boundary between the two disparate 20-bit characters. As a result, the SERDES circuits in the link cards and multiplexer units are run with their "comma detect" mode disabled, except during link initialization, so as to prevent the SERDES circuits from accidentally realigning the received bit streams on a false comma.

In the inbound data path within the TDM smoother 206, a time division demultiplexer (TDDM) 240 receives a 20-bit 125 MHZ signal. The received signal contains two logical subchannels, in the form of alternating 20-bit characters. The TDDM 240 inspects the received signal to (A) find the 20-bit word boundaries in the signal and (B) determine which logical subchannel has K28.1 characters and is therefore Channel A. The TDDM 240 transmits the 20-bit characters from first subchannel through a first Rx DataPath circuit 232-3 to a first output buffer 244-1, and transmits the 20-bit characters for the second subchannel through a second Rx DataPath circuit 232-4 to a second output buffer 244-2. The output buffers 244 each convert a received stream of 20-bit 62.5 MHZ data signals into a 125 MHZ stream of 10-bit characters.

Each of the Rx DataPath circuits 232 receives a stream of 20 bit symbols, but outputs a data stream of 18 bit symbols, each of which includes 16 bits of data, one flag to indicate if the first 8 bits need to be encoded as a "K character," and a valid bit to indicate if the data word is valid or invalid. These 18 bits are then encoded by a respective one of the 8b/10b encoders 242.

The Channel A data path circuit within the RX DataPath circuit also has an Inband Tx circuit 246 for inserting special inband control frames into the data stream during the idle times. Control information can be distributed to the controllers in the link cards and multiplexer units of a fiber optic network by a single computer system or a single node controller on the fiber optic network. The controllers within the network system communicate with each by having the control CPU's 212 of the MUX units 142 (and the control CPU's 180 of the link cards 140) send these inband frames. The control CPU 212 writes the frame to a 64 byte register inside the Inband Tx circuit 246. The control CPU then writes a flag to tell the hardware that the frame is ready to go. When the Rx DataPath 232-1 indicates there is enough idle space to insert a control frame (as detailed in more below), the Inband Tx circuit 246 inserts the control frame with a special start of frame delimiter onto the DataPath instead of Idles.

When the inband control frame arrives at another MUX unit, after transmission over an optical fiber cable, the Inband Rx circuit 248 detects the special start of frame delimiter and stores the 64 byte frame data into the next one of eight Rx buffers (included in Status and Control Registers 254). The Inband Rx circuit 248 propagates Idles instead of the inband control frame data to the subsequent 8b/10b encoder 242-3. Once the entire Inband frame is received, the Inband Rx circuit marks the Rx buffer into which the frame was written as being in use and signals the control CPU 250 that an Inband control frame is available. Once the control CPU 212 has read the frame, it marks the Rx buffer as available. If a special inband frame is received and the next Rx buffer is not available, the inband frame data is discarded by the Inband Rx circuit 248.

The TDM smoother 206 also includes a set of status and control registers 254 that are read by the Mux unit's CPU 212 via a CPU interface 252.

In an alternate embodiment, the TDM 234 does not change the K character symbols of one of the data streams so as to mark the A and B channels. Instead, the link cards of the system insert immediately before each frame a special Start of Packet (SOP) K character, replacing the Idle that immediately precedes the frame with SOP symbol. This task is performed by logic and the front end of the Rx DataPath circuit, and in particular in the FC Rx DataPath circuit 193-1 and GE Rx DataPath circuit 193-2. The TDM 234, upon receiving an SOP symbol from the Channel A data path converts that symbol into a SOP1 symbol, thereby marking the data in Channel A as the first data channel. The TDDM 240 inspects the received signal to (A) find the 20-bit word boundaries in the signal and (B) determine which logical subchannel has SOP1 characters and is therefore Channel A. The TDDM 240 transmits the 20-bit characters from first subchannel through a first Rx DataPath circuit 232-3 to a first output buffer 244-1, and transmits the 20-bit characters for the second subchannel through a second Rx DataPath circuit 232-4 to a second output buffer 244-2. Furthermore, the TDDM 240 converts the SOP and SOP1 symbols back into Idle symbols, since these special symbols are only for internal use within the fiber optic network.

Rx DataPath Circuit

Figure 11:
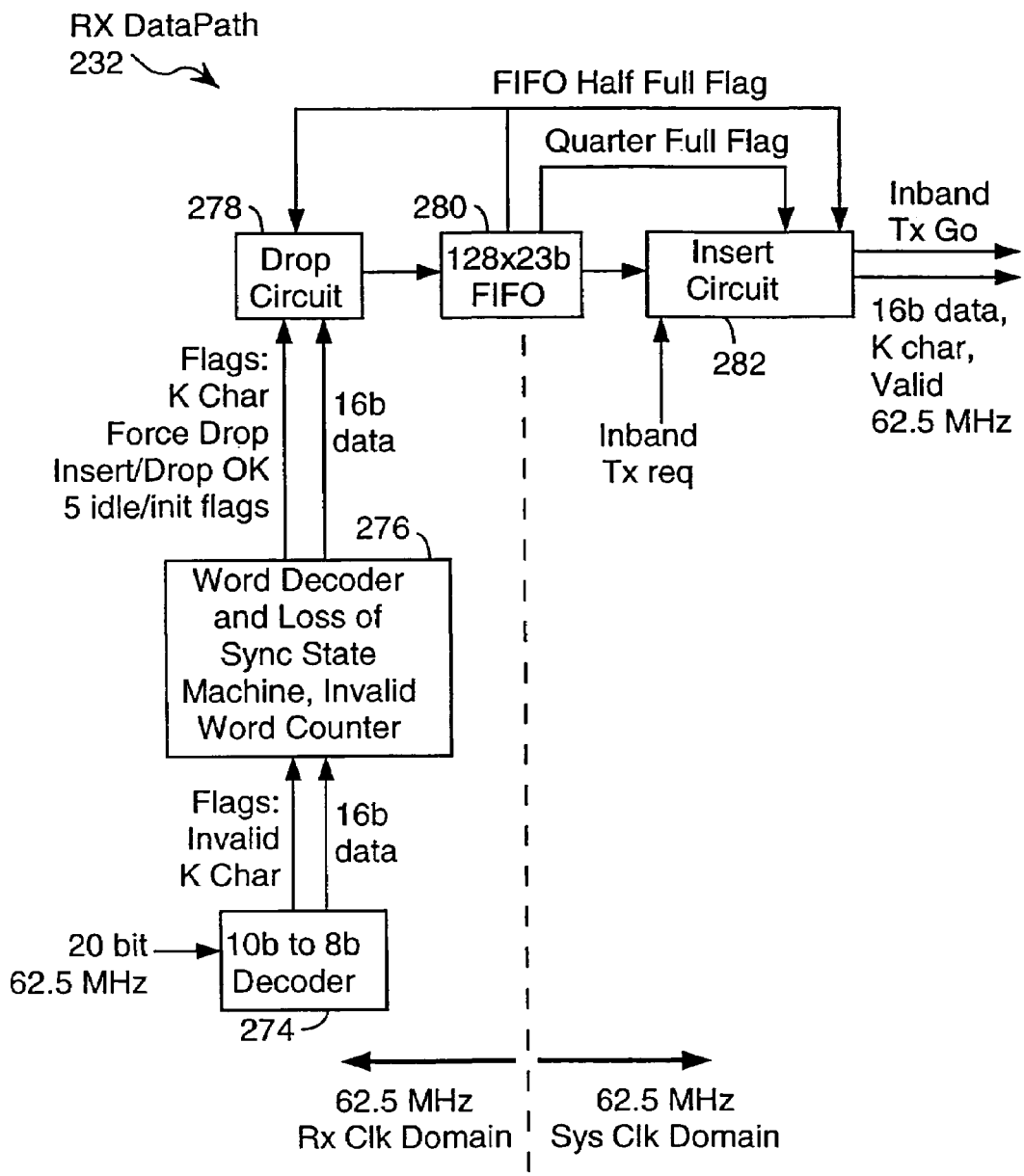
FIG. 11 is a block diagram of a receive datapath circuit, multiple instances of which are used in the time division multiplexer and transmission rate smoothing circuit of FIG. 7.

Referring to FIG. 11, the Rx DataPath circuit 232, (of which there are four instances in each TDM smoother 206, FIG. 10, and two instances in each MUX interface frame processor 170, FIG. 6), receives a 20 bit signal converts it to 16 bit data, a K character flag and an invalid word flag.

The Rx DataPath circuit 232 replaces any invalid words that are in a frame with a special violation word (FVIO), eliminates any invalid words that are outside of a frame, and retimes the data stream onto the local clock of the link card or MUX unit. It also maintains a count of invalid words received so that failing links can be easily isolated.

Each received 20 bit word is initially decoded into 16 bit data and flags by a 10b to 8b decoder circuit 274. The decoder circuit 274 produces a K-character flag plus a valid flag that indicates whether the 20 bit word was made up of valid 10 bit codes. The 16 bit data and flags are sent to a word decoder and loss of synch state machine 276.

The word decoder 276 keeps track of whether the received data is inside a frame or outside of frame by recognizing the start of frame and end of frame delimiters. If the received word is valid, the 16 bit data and K character flag are passed as is to a drop circuit 278. If the received word is invalid and the data is in the middle of frame, the word is replaced with the special FVIO word. Downstream logic will recognize that this is not the original data, but it will not count it as an invalid word to facilitate error isolation, because it is not known where along data path the error occurred except that it occurred at a node prior to the receiving node. If the received word is invalid and the data is not in a frame, then a Force Drop flag is asserted to the drop circuit 278 so that the invalid word will be dropped completely from the data stream.

If the state machine 276 detects four invalid words within any ten consecutive words, the state machine 276 assumes that the received data stream has lost synchronization. In this case it will propagate an FNOS word to the drop circuit 278, marked with a K-character flag and a Insert/Drop OK flag. After this, the state machine inspects the incoming data stream and replaces each word in the data stream with an FNOS word until it receives three consecutive valid words that are either Link Initialization words or Idles, at which point the state machine 276 assumes that synchronization of the received data has been re-established and resumes propagating words from the data stream to the drop circuit 278.

In addition, the word decoder and los of synch state machine 276 determines if the received word is an Idle or one of a predefined set of four link initialization words. When any of these five symbols is detected, the state machine 276 sets a corresponding one 5 idle/init decode flags and also sets the Insert/Drop OK flag.

The 16 bit data, K character flag, 5 idle/init decode flags and the Insert/Drop Ok flag are passed through a 23 bit wide FIFO 280. In a preferred embodiment, the FIFO 280 stores up to 128 words, each 23 bits wide.

The drop circuit 278, 128×23b FIFO 280 and an insert circuit 282 form a smoother or data retiming circuit. The drop circuit 278 and the write side of the FIFO 280 operate on the Rx Clock (recovered by the external SERDES circuit from the serial receive data).

The insert circuit 282 and the read side of the FIFO 280 operate on a System clock that comes from a local oscillator. Nominally, both of these clocks operate at the same frequency, but in practice they will be slightly different, and thus the need to retime the data stream.

The drop circuit 278 normally writes to the FIFO 280 every clock cycle. However if the Force Drop flag is on (i.e., set), or if the FIFO 280 is more than half full and the Insert/Drop Ok flag is on, the FIFO write enable will be suppressed and the current word from the decoder 276 will be discarded (i.e., it will not be written into the FIFO 280).

The insert circuit 282 normally reads from the FIFO 280 every cycle. However if the FIFO 280 is less than one quarter full and the last word read from the FIFO 280 had the Insert/Drop OK flag set, the FIFO read is suppressed and last read word is replicated onto the output.

Thus if the Rx clock is slightly faster than the System clock, the FIFO 280 will occasionally go past half full since the rate of reads from the FIFO is slightly slower than the rate of writes to the FIFO. The drop circuit 278 will then occasionally drop words to keep the FIFO 280 less than half full. If the System clock is slightly faster than the Rx Clock, then the FIFO will occasionally go below one quarter full since the rate of reads from the FIFO is slightly faster than the rate of writes. The insert circuit 282 will then insert a word into the data stream to keep the FIFO above one quarter full.

In addition, the insert circuit 282 has some special features to support the transmission of Inband data. When the Inband Tx circuit 246 (e.g., of the TDM smoother) has an inband frame to transmit, it will assert an Inband Tx request signal. If the FIFO 280 is less than half full, and the current word has the Insert/Drop OK flag on, the insert circuit 282 stops reading from the FIFO 280 and sends an "Inband Tx go" signal to the Inband Tx circuit that is immediately downstream from the RX DataPath circuit 232. The insert circuit continues to replicate the current word on its output for several clock cycles, until the entire pending Inband frame has been inserted into the data stream by the Inband Tx circuit.

While the Inband Tx go signal is asserted, the downstream inband Tx circuit will replace the data from the Rx DataPath circuit with the Inband Tx frame. Once the inband frame transmission is complete, the Inband Tx circuit de-asserts the Inband Tx request signal, and the insert circuit 282 resumes normal operation. After an Inband frame has been sent, the FIFO 280 will often be more than half full, and therefore the drop circuit 278 will drop as many words as possible to bring the FIFO back under half full.

Since the Inband frames are 64 bytes in length and half of a FIFO holds 128 bytes (64 two byte words), the FIFO 280 will not be overrun while inband transmission is in progress, since the inband transmission will not start until the FIFO 280 is less than half full.

Another function of the insert circuit 282 is to set a valid output flag for use by the MUX interface frame processor instances of the Rx DataPath circuit 232. The insert circuit 282 sets the valid output flag whenever (A) the word read from the FIFO does not have its Insert/Drop OK flag on, or (B) the word read from the FIFO is not an Idle or link initialization word that is the same as the previous word as determined by the 5 idle/init flags passed through the FIFO. The MUX interface frame processor uses the valid output flag to determine what words need to be written to the Outbound frame buffer 168 (FIG. 5). The Rx DataPath valid output flag is not used by the TDM smoother 206.

It is noted that the use of a deep FIFO in the Rx DataPath circuit makes it simple to use half full and quarter full flags to control the insert and drop circuits. Making the FIFO 280 sufficient wide to propagate the Insert/Drop OK and the five Idle/Init flags avoids having to redecode the words on the output of the FIFO. Alternate embodiments may have different technology constraints and choose to implement the same functionality using a shallower and narrower FIFO with additional decode logic.

In the alternate embodiment in which SOP and SOP1 symbols are used to mark the Channel A and Channel B data streams, the Rx DataPath circuits 193-1 and 193-2 in the link cards have a slightly modified word decoder and state machine 276. In this embodiment, the word decoder 276 includes a FIFO, which can have a length of one or two words, that enables the word decoder to perform a look ahead for start of frame (SOF) symbols preceded by an Idle. Whenever this combination of two symbols is detected by the word decoder 276, the word decoder replaces the Idle immediately preceding the SOF with an SOP symbol. As explained above, the SOP symbol in Channel A is replaced by an SOP1 symbol by the TDM circuit 234 in the TDM smoother circuit of a Mux unit.

Static Configuration of Ring Network

During normal operation, the data stream paths through the ring network are statically configured. That is, the signal paths are not constantly being determined on the fly. Rather, it is assumed that the customers using ring network lease bandwidth on the network on an ongoing basis. Signal paths through the network are, in general, changed only when (A) there is a change in the set of leased channels on the network, or (B) there is a link failure.

Distance Buffering

In many applications, the host devices (also called clients or client devices) communicating via the ring network are many kilometers apart. For instance when two devices are fifty kilometers apart, with a round trip communication path of 100 kilometers, the round trip communication time is at least 500 microseconds, excluding the time it takes for the receiving device to receive and respond to an incoming signal. If the input buffers of the receiving device are small (e.g., 8 k bytes), the effective bandwidth of a 1.0625 Gbps channel may be much smaller than the full bandwidth. For instance, consider a system in which a client device requests files from a disk farm at a node that is fifty kilometers away, and the requesting client's input buffers only hold 8 k bytes (i.e., about four Fibre Channel frames). When the client sends its initial data request, it also sends four storage credits to the disk farm node. It does not send more than four credits because that would cause the disk farm to send more data than the client can reliably buffer and process, which would result in costly resend requests and large delays.

The disk farm, using prior art methodology, responds by sending only four FC frames of data and waits until it receives more storage credits from the requesting client before sending any more. However, it takes at least 500 microseconds for the client to receive the first data and return another three credits. Thus, at best, the client is able to receive 8 k bytes per 500 microsecond period, or a total data rate of about 16 Megabytes per second, as opposed to the 100 Megabytes per second bandwidth of the channel. Thus, in this example, about 84% of the available bandwidth is wasted due to the long round trip time required for sending storage credits to the sending device. This performance can be improved by increasing the size of the requesting client's input buffers, as well as by sending a new storage credit as soon as each frame is received.

In the present invention, bandwidth usage is improved by providing frame buffers 166, 168 (FIG. 5) in the link cards and then splitting the flow control into three separate domains. The domains are (1) client device to link card, (2) link card to link card across the fiber optic network, and (3) link card to client device. As long as the buffering in the client devices is sufficient to handle the round trip link time from the client device to the link card full bandwidth can be maintained, in part because of the large frame buffers 166, 168 provided in the link cards and in part due to the use of the link cards as the senders and receivers of storage credits.

Based on the number of frames in the Inbound Frame Buffer 166, the Link interface frame processor will issue flow control primitives to the attached client device to maintain maximum bandwidth while ensuring the Inbound Frame buffer does not overflow. Based on the flow control primitives issued by the attached client device the Link interface frame processor will control the reading of the Outbound frame buffer 168.

Details of Distance Buffering for Fibre Channel Link Cards

After a Fibre Channel Link is initialized, Fibre Channel Devices perform a login procedure that includes exchanging how many buffer to buffer credits they have. The number of buffer to buffer credits advertised by a first client at one end of a Fibre Channel link is the number of frames a second client, attached to the first client by the link, can send to the first client before it needs to wait for additional credit. Additional credits are transferred by sending a special word, called RRDY. One RRDY word transfers one credit, which enables the receiving device to transmit on Fibre Channel frame.

The fiber optic network of the present invention allows the login procedure between the two attached client devices to complete without modifying the information exchanged. The link cards of the system do, however, determine the number of buffer to buffer credits supported by the devices at each end of the link by examining the login frames as they pass through.

Referring to FIG. 7, the inbound frame buffer 166 and outbound frame buffer 168 can each hold a maximum of 240 maximum sized Fibre channel frames. Whenever a frame is written to the inbound frame buffer 166, the RX_credit circuit 194-1 increments a "pending RRDY" counter internal to the link card. Whenever the outbound link to the client device is idle, the inbound frame buffer is less than half full, and the pending RRDY counter is greater than zero, the TX_Credit circuit 198-1 inserts a Fibre channel RRDY word into the Tx data stream and decrements the pending RRDY counter. If the inbound frame buffer is more than half full, the RRDY's are held pending until the inbound frame buffer drops below half full. Thus there is room in the inbound frame buffer for up to 120 frames to arrive without any additional RRDY's being sent. The attached FC client device is actually operating under the assumption that it can only send as many frames as was specified by the client device on the remote end of the fiber optic network. As long as the remote device's buffer to buffer credit is less than or equal to 120 frames, the flow control between the local client device and the inbound frame buffer will operate properly. If the advertised buffer credit (of the remote device) is greater than 120, then distance buffering can be disabled, in which case all frames and RRDY's will be passed through the system end to end with no internal buffering of storage credits. As of the year 2000, most FC client devices have buffer to buffer credits in the range of two to sixteen frames. Very few FC client devices have internal buffering for even as many as sixty-four FC frames.

The flow control of frames from the Outbound Frame Buffer 168 to the client device operates as follows. The link card must obey the buffer to buffer credit advertised by the attached device during login. The TX_credit circuit 198-1 initializes an available credit counter to the advertised number as it examines the login frames. Subsequently whenever it sends a frame it decrements the available credit counter by one. Whenever the RX_credit circuit 194-1 receives an RRDY it increments the available credit counter by one. As long as the available credit counter is greater than zero, frames are read from the Outbound frame buffer and sent to the client device. If the available credit counter is zero, then frames are held pending in the Outbound frame buffer until an RRDY arrives.

Details of Distance Buffering for Gigabit Ethernet Link Cards

Referring to FIG. 8, whenever the Inbound Frame Buffer is more than half full the Tx_Pause circuit 198-2 sends an Ethernet Pause frame to the attached device with the pause_time field set to the maximum value. This should cause the attached device to stop sending Ethernet frames. Once the Inbound Frame Buffer is less than half full, the Tx_Pause circuit 198-2 sends an Ethernet Pause frame with a zero in the pause_time field to allow the attached device to resume sending frames.

If the Rx_Pause circuit 194-2 receives a Pause frame and distance buffering is enabled, the pause time counter is loaded from the pause_time field. The pause time counter is decremented by 1 each 512 bit times (which is the Ethernet standard). If the pause time counter is greater than zero, then frames are held pending in the Outbound Frame Buffer by the FIFO read circuit 200-2.

Details of Distance Buffering Between Connected Link Cards

The previous two sections have described the details of the flow control operation between the link cards and the attached Fibre Channel or gigabit Ethernet devices. Additionally there is a flow control mechanism between the MUX interface frame processors on the two link cards that are connected across the fiber optic network. The same mechanism is used independent of whether the link is being used for gigabit Ethernet or Fibre Channel.

Referring to FIG. 6, the link card to link card flow control operates in a fashion very similar to the standard Fibre Channel flow control mechanism. At initialization time the MUX interface frame processors 170 assume the attached link card has 120 buffer credits available. The available buffer credit is decremented by 1 (by the Tx credit circuit 186) each time a frame is sent from an inbound frame buffer. The available buffer credit is incremented by 1 (by the Rx credit circuit 190) each time an intra-network buffer credit word (called FRRDY for "Finisar FRRDY") is received. If the available buffer credit is zero, frames are held pending in the inbound FIFO frame buffer.

As long as the outbound FIFO frame buffer is less than half full an FRRDY intra-network buffer credit is sent back across the network (by the Tx credit circuit 186) each time a frame is written to the outbound FIFO frame buffer. If the outbound frame buffer is more than half full, the FRRDY intra-network buffer credits are held pending (and are sent once the outbound FIFO frame buffer becomes less than half full).

Channel Blending

Most communication channels are not used anywhere close to 100% of capacity. In fact, most of the time channel usage is well below 50%, although peak usage may reach 100%. Facilities exist in the fiber optic network of the present invention to allow multiple external gigabit per second channels to be "blended" into a single gigabit per second channel, which is then transmitted over the relatively expensive long haul fibers. This allows the long haul fibers to be utilized closer to their full capacity. The present invention provides two ways to blend channels together.

Referring to FIG. 5, a first channel blending scheme allows the two channels on a single link card to be "blended" into a single channel by the Mux unit interface 154. Thus a dual channel link card will use only a single 1.25 Gbps channel on one MUX unit, instead of one channel on each of two MUX unit as was described previously. The two channels on this link card are then connected to two channels on another link card. While one channel is transmitting a frame to the MUX unit interface 154, any frames from the other channel are held in its Inbound FIFO frame buffer 166. The large size of the frame buffers 166 on the link card give the system the ability to absorb relatively long bursts of frames, up to 360 frames, arriving from both channels at the same time without having to slow down the senders. Whenever the frame bursts from the channels are shorter than that, the idle times between bursts are used to empty the inbound frame buffers over the single Mux channel, without having to send flow control words to force the client device to slow down the rat at which it sends frames. In this scheme the normal SOF (start of frame) delimiters used internal to the fiber optic network have one bit modified to indicate which link card channel the data is being sent to and from.

In a second channel blending scheme, multiple link cards (in two more network nodes) are connected in a logical ring. All frames are encapsulated with a target link card ID. As frames arrive in the MUX interface frame processor, the target link card ID is decoded. If the target link card ID in the frame matches the ID of the receiving link card, the frame is stored in the appropriate outbound frame buffer. If the target link card ID's do not match, the data is forwarded to another node through the MUX interface frame processor. If data is not currently being passed back through to the MUX interface frame processor, data from one of the inbound frame buffers can then be sent out to the MUX unit. To handle the case when a pass through frame starts arriving from the MUX unit shortly after a frame transmission is started from the inbound frame buffer, a supplemental buffer is provided to buffer one frame inside the MUX interface frame processor. In addition, the link cards meter their data flow onto the network by using a "leaky bucket" methodology to keep their bandwidth to a user specified amount. If a given link card is not using all of it's specified bandwidth, it can send a bandwidth credit onto the network which another link card can claim to temporarily burst above its user specified maximum.

Responding to Link Failures

The ring architecture of the present system can be used with redundancy techniques to provide a complete redundancy solution, enabling the system to be reconfigured in response to virtually any component failure to as to restore data transmission services to all or almost all nodes of the system.

Figure 12:
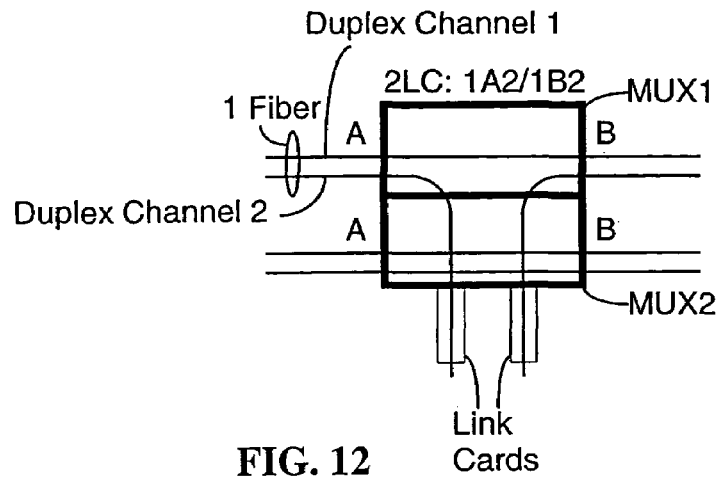
FIG. 12 is a block diagram illustrating a segment of a fiber optic ring network.

FIG. 12 shows the symbols that will be used in the following figures to represent one node of a fiber optic network in accordance with the present invention. Each Mux unit of the node is shown as a rectangular box, and each optical fiber cable connected to the node is represented by two lines, with each line representing a distinct logical channel. Link cards are represented by smaller boxes next to one of the Mux boxes. A label such as "2LC: 1A2/1B2" indicates the number of link cards, and also indicates which Mux unit ports are connected to the link cards.

Figure 13:
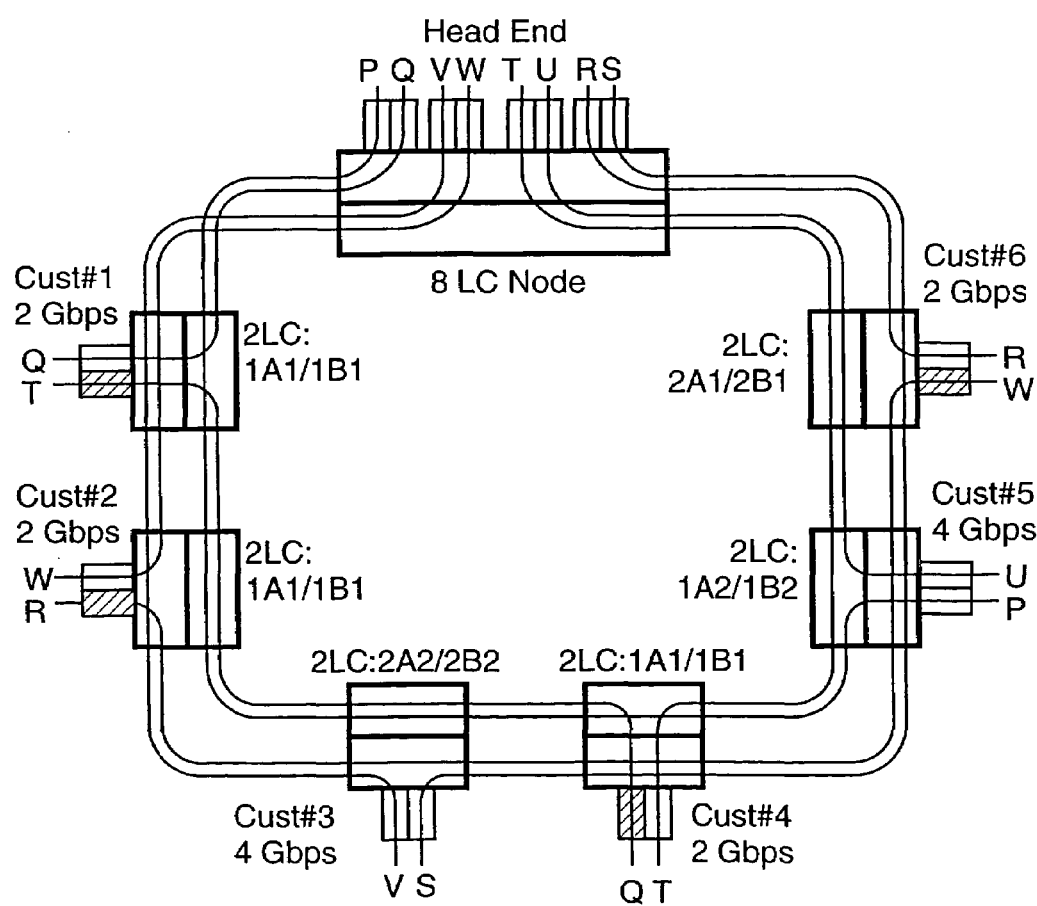
FIG. 13 is a block diagram illustrating a fiber optic ring network in accordance with the present invention.

FIG. 13 shows a typical fiber optic network in accordance with the present invention. As shown, in many networks using the present invention there will be a "Head End" node that has individual link cards that are connected by the network to link cards in several different customer nodes. The "Head End" node may be considered a "Point of Presence" node for a service provider and the "Customer" nodes are high bandwidth clients served by the Point of Presence. In this example, Customers 3 and 5 have two "clear" channels all the way to the Head End node. The other customers have one clear channel each, along with another clear channel to another customer node. It should be understood that the system configuration shown in FIG. 13 is merely one example of many, many possible such configurations.

In order to provide a variety of failover redundancy modes, it is preferred for a standard switch (either Fibre Channel or Gigabit Ethernet) to be installed immediately behind the link cards at each customer node. The switch is enabled only during certain failover modes of operation, as will be described below. As will be shown, these switches are used in the context of the present invention to automatically route around any failures in the links from the switch to the link card, or with the link card itself.

These switches also allow backup paths to be provided by the fiber optic network that "hop" through these external switches. In normal operation these backup paths will not be used because the shortest routes through the network, which do not go through these switches, will be used as the primary data paths. The link cards reserved for use as backup paths are marked in the figures with diagonally hatched fill patterns.

Figure 14:
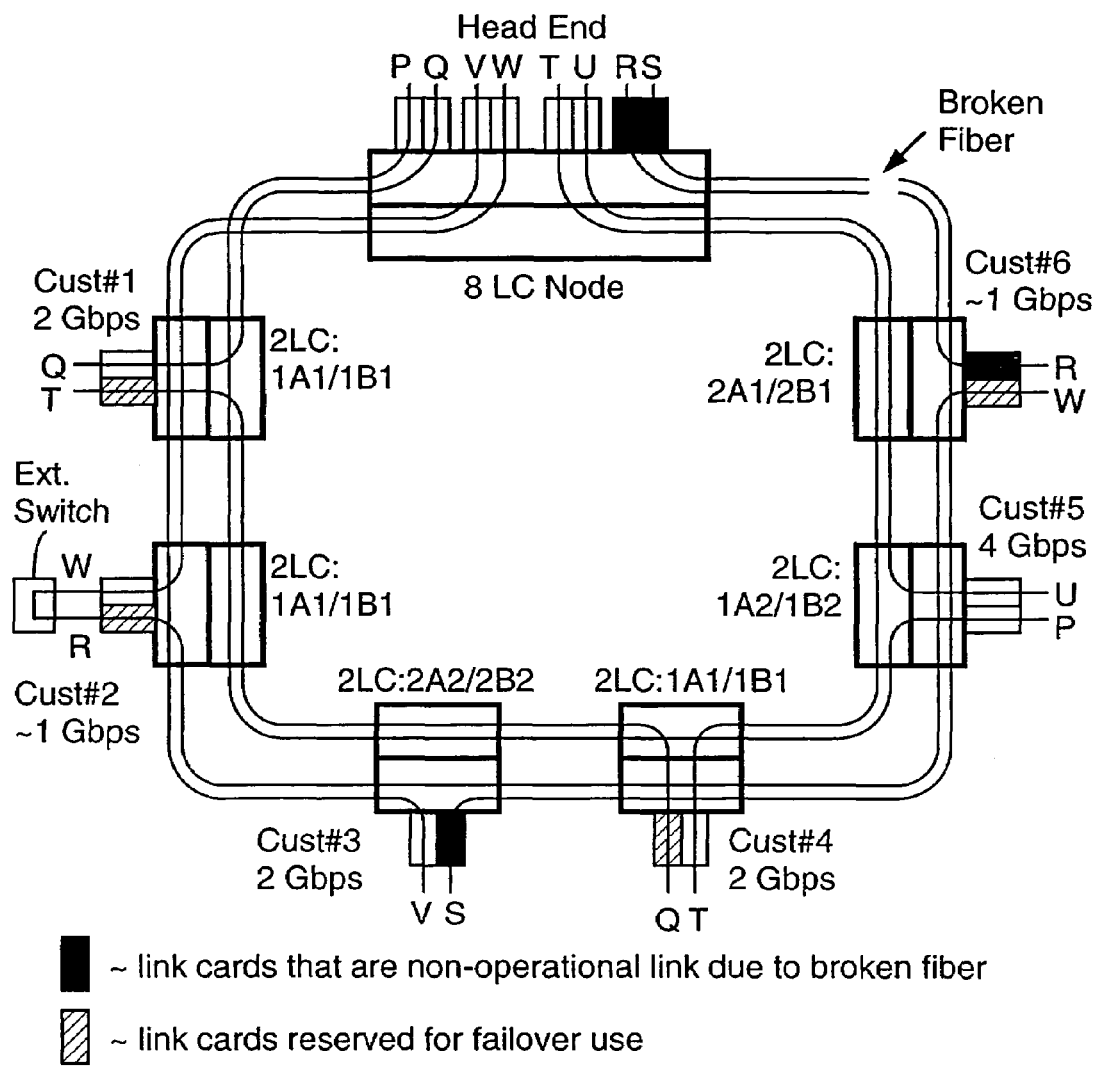
FIG. 14 is a block diagram illustrating how the fiber optic ring network illustrated in FIG. 13 is reconfigured during failover caused by a broken fiber.

However when a fiber breaks, as shown in FIG. 14, then the loss of the link will be reflected to the attached switches and one or more of the switches is enabled to activate the backup path. As shown in FIG. 14, the switch at Customer node #2 is enabled, routing traffic back and forth between the two link cards at that node. Customer node #6 loses it's direct connection to the head end, but the activation of the switch at Customer node #2 provides it with a path to the head end through Customer node #2. The total maximum bandwidth of nodes 2 and 6 will be cut in half, though each node could use the original maximum bandwidth if the other node is idle. Customer node #3 loses one of it's direct paths to the head end, but has a second path to the head end that is active.

Figure 15:
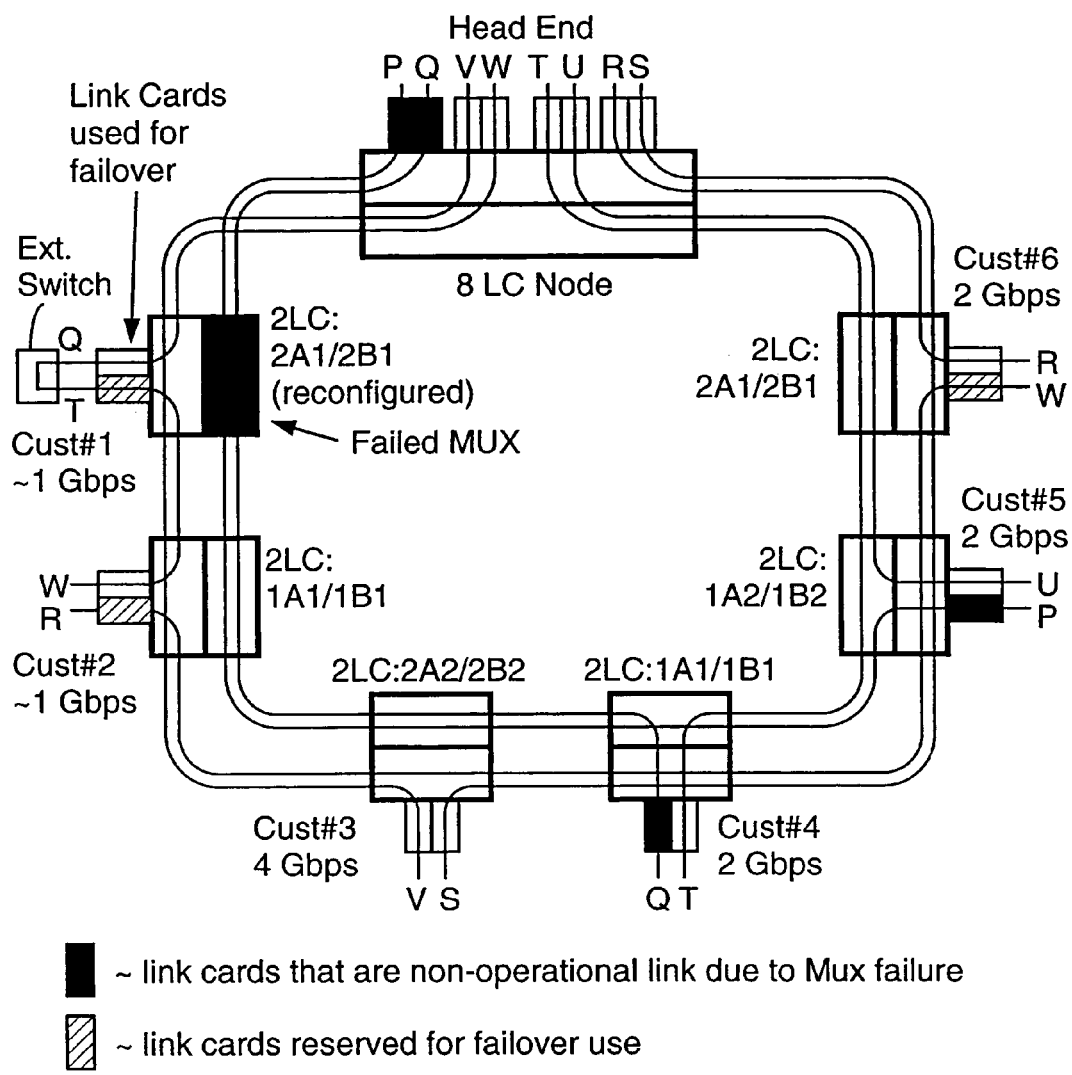
FIG. 15 is a block diagram illustrating how the fiber optic ring network illustrated in FIG. 13 is reconfigured during failover caused by a failed (client device) node.

Referring to FIG. 15, a more complicated failover scenario is when one of the Mux cards in a customer node fails. In order to maximally use the bandwidth of the ring during normal operation, nodes with just two link cards are configured to use the same Mux unit with one link card going out one Mux port and the other link card going out the other Mux port. If the Mux unit to which both link cards are connected fails, and thereby cuts off both link cards from the network, the link card controllers will configure both link cards to use a user specified backup path on the other Mux unit and the external switch on that node will be activated, as shown for Customer node #1 in FIG. 15. In a system where all network data paths are used, this reconfiguration will result in the two link cards of the node with the failed Mux unit being inserted in the middle of an already used link.

To other nodes on the fiber optic network, a client node Mux unit failure appears the same as a fiber break and thus is handled as discussed previously.

Figure 16:
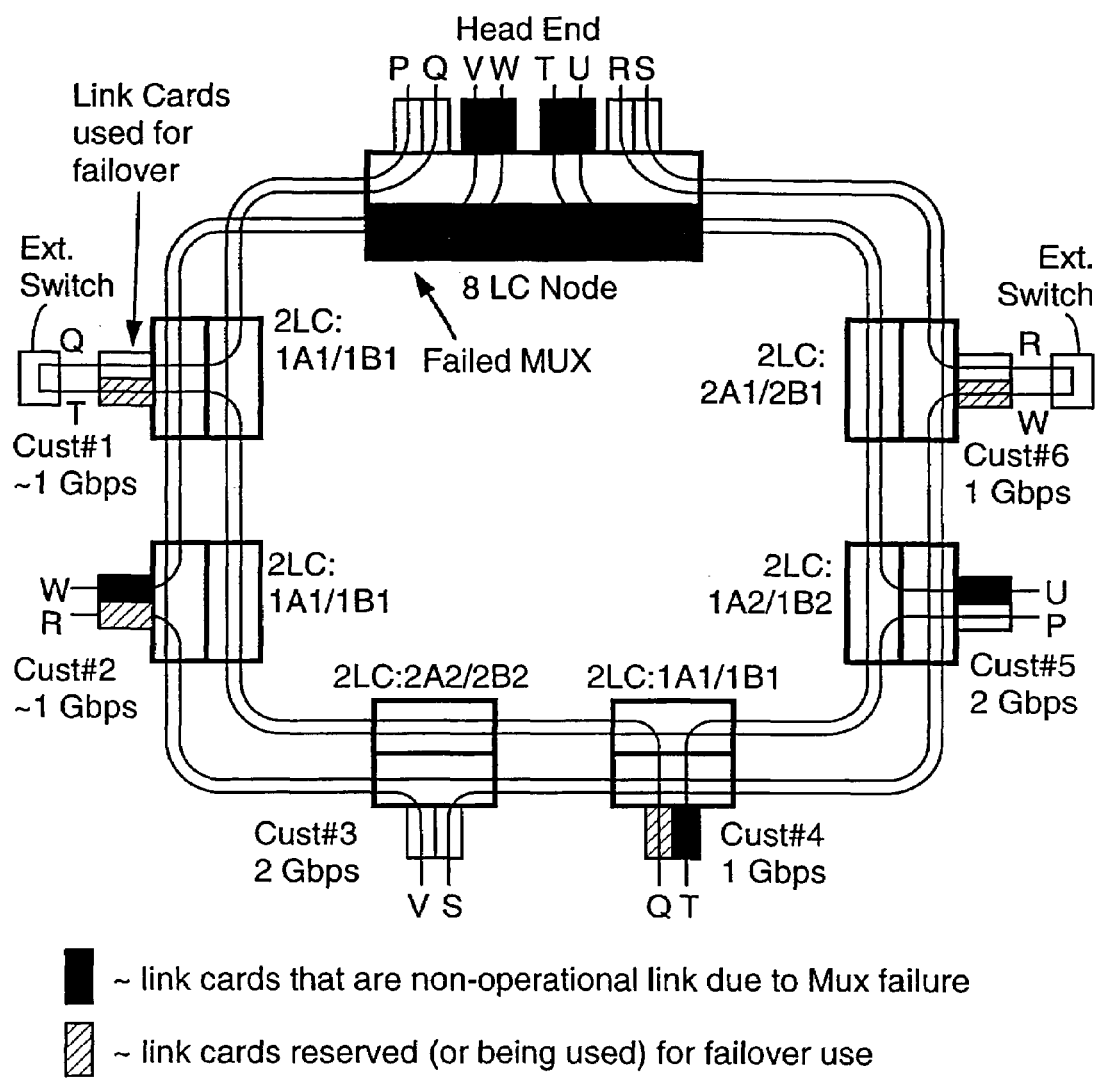
FIG. 16 is a block diagram illustrating how the fiber optic ring network illustrated in FIG. 13 is reconfigured during failover caused by a failed MUX at a head end of the fiber optic ring network.

Referring to FIG. 16, another failover mode is used when one of the "Head End" Mux units fails. To handle this correctly the Head End will be connected to the optical fiber cables so that each Mux unit is connected to both fiber optic rings. In addition, the external switches at two or more customer nodes will need to be activated. Thus if one of the Head End Mux units fails, each customer node will have at least one link card that is still connected by a live data path to the remaining alive Mux unit at the Head End.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A configuration for an optical fiber ring network, comprising:
   two or more nodes, each node including,
   a multiplexing device,
   a client device, and
   redundant signal connections between the multiplexing device and the client device;
   redundant signal paths connecting the nodes, each of the redundant signal paths including an optical fiber link operable to transmit data bi-directionally between each pair of connected nodes,
   wherein the multiplexing device is configured to selectively transmit outgoing data from the client device, and selectively receive incoming data destined for the client device, over each of the redundant signal paths, the multiplexing device being selectively linked to the client device for data communications by each of the redundant signal connections;
   wherein the redundant signal connections include,
   first and second link cards, each operable to communicate data between the multiplexing device and the client device, and
   a switching apparatus operable to activate one of the first and second link cards, wherein
   the activated link card conveys the outgoing data from the client device to the multiplexing device, and conveys the incoming data from the multiplexing device to the client device; and
   wherein
   the redundant data paths include a first and second data path,
   the multiplexing device includes a first and a second multiplexing unit configured to transmit the outgoing data and receive the incoming data over the first and second signal path, respectively, and
   the activated link card selectively links the client device to each of the first and second multiplexing units for data communications.

2. The configuration of claim 1, wherein the redundant signal connections includes a primary connection and a backup connection each being operable to convey the incoming and outgoing data between the multiplexing device and the client device, the backup connection enabling the incoming and outgoing data to be routed around a link failure occurring in the primary connection.

3. The configuration of claim 1, wherein the activated link card is a Fiber Channel (FC) link card.

4. The configuration of claim 1, wherein the first link card is configured to operate according to Fibre Channel (FC) protocol and the second link card is configured to operate according to Ethernet protocol.

5. The configuration of claim 1, wherein
   the multiplexing device includes a coarse optical wavelength multiplexer and demultiplexer operable to transmit a first data stream over the optical fiber cable using a first optical wavelength and to receive a second data stream over the optical fiber cable using a second optical wavelength.

6. An apparatus for use at a node of an optical fiber ring network, comprising:
   redundant data paths each including an optical fiber link operable to transmit data bi-directionally between the node and another node in the network;
   a multiplexing device configured to selectively transmit outgoing data from a client device, and selectively receive incoming data destined for the client device, over each of the redundant data paths, the multiplexing device being selectively linked to the client device for data communications by redundant signal connections,
   wherein the multiplexing device is operable to selectively transmit and receive the incoming and outgoing data, respectively, according to Fibre Channel (FC) protocol;
   wherein the redundant data signals connections include first and second link card, each operable to communicate data between the multiplexing device and the client device; and a switching apparatus operable to activate one of the first and second link cards, wherein the activated link card conveys the outgoing data from the client device to the multiplexing device, and conveys the incoming data from the multiplexing device to the client device; and wherein the redundant data paths include a first and a second data path, the multiplexing device includes a first and second multiplexing unit configured to transmit the outgoing data and receive the incoming data over the first and second signal path, respectively, and the activated link card selectively links the client device to each of the first and second multiplexing units for data communications.

7. The apparatus of claim 6, wherein the first and second link cards each include an inbound FIFO frame buffer with memory capacity for storing at least 120 Fibre Channel frames sent by the client device to the link card and an outbound FIFO frame buffer with memory capacity for storing at least 120 Fibre Channel frames sent by another device to the link card for transmission to the client device.

8. The apparatus of claim 7, wherein the first and second link cards each include circuitry for exchanging buffer credit signals with another link card coupled thereto by one of the first and second optical fiber cables so as to pre-fill the outbound FIFO frame buffer with frames of data before the client device sends flow control messages to request the transmission of those data frames by another client device coupled to the other link card.

9. The apparatus of claim 7, wherein the first and second link cards each includes flow control circuitry for pre-filling the outbound FIFO frame buffer with frames of data before the client device sends flow control messages to request the transmission of those data frames.

10. The apparatus of claim 6, wherein
the first and second link cards each include an inbound FIFO frame buffer for storing frames sent by the client device to the link card and an outbound FIFO frame buffer for storing frames sent by another device to the link card for transmission to the client device; and
the first and second link cards each store data into the inbound FIFO frame buffer and read data from the outbound FIFO frame buffer at a first clock rate associated with the client device, and read data from the inbound FIFO frame buffer for transmission to the multiplexer device and store data received from the multiplexing device into the outbound FIFO frame buffer at a second clock rate associated with the link card, whereby the data stream sent and received to and from the client device is retimed from the first clock rate to the second clock rate.

11. The apparatus of claim 10, wherein data streams sent and received to and from the client device are Fibre Channel data streams, the first clock rate is approximately 1.0625 Gbps, and the second clock rate is at least 1.25 Gbps.

12. The apparatus of claim 10, wherein the multiplexer device includes a smoothing circuit that retimes the first data stream sent from the client device from the second clock rate to a third clock rate associated with the first multiplexer device, the multiplexer device transmitting the first data stream over one of the first and second optical fiber cables at the third clock rate.

13. The apparatus of claim 6, wherein
the multiplexing device includes a coarse optical wavelength multiplexer and demultiplexer operable to transmit a first data stream over the optical fiber cable using a first optical wavelength and to receive a second data stream over the optical fiber cable using a second optical wavelength.

* * * * *